US011149203B2

(12) United States Patent
Khan et al.

(10) Patent No.: US 11,149,203 B2
(45) Date of Patent: Oct. 19, 2021

(54) LIQUID CRYSTAL COMPOSITION CONTAINING A FIVE-MEMBERED HETEROCYCLIC RING, REVERSE-MODE POLYMER DISPERSED LIQUID CRYSTAL ELEMENT, AND ASSOCIATED SELECTIVELY DIMMABLE DEVICE

(71) Applicant: NITTO DENKO CORPORATION, Osaka (JP)

(72) Inventors: Sazzadur Rahman Khan, Oceanside, CA (US); Hiep Luu, San Marcos, CA (US)

(73) Assignee: NITTO DENKO CORPORATION, Osaka (JP)

( * ) Notice: Subject to any disclaimer, the term of this patent is extended or adjusted under 35 U.S.C. 154(b) by 138 days.

(21) Appl. No.: 16/485,586

(22) PCT Filed: Feb. 14, 2018

(86) PCT No.: PCT/US2018/018252
§ 371 (c)(1),
(2) Date: Aug. 13, 2019

(87) PCT Pub. No.: WO2018/152257
PCT Pub. Date: Aug. 23, 2018

(65) Prior Publication Data
US 2020/0017768 A1 Jan. 16, 2020

Related U.S. Application Data

(60) Provisional application No. 62/458,971, filed on Feb. 14, 2017, provisional application No. 62/569,400, filed on Oct. 6, 2017.

(51) Int. Cl.
G02F 1/1333 (2006.01)
C09K 19/34 (2006.01)
G02F 1/1337 (2006.01)
G02F 1/137 (2006.01)

(52) U.S. Cl.
CPC ...... *C09K 19/3497* (2013.01); *C09K 19/3491* (2013.01); *G02F 1/137* (2013.01); *G02F 1/1337* (2013.01)

(58) Field of Classification Search
CPC ........... C09K 19/3497; C09K 19/3491; G02F 1/137; G02F 1/1337; G02F 1/1333
USPC ..................................... 252/299.6
See application file for complete search history.

(56) References Cited

U.S. PATENT DOCUMENTS

| 6,696,110 B1 | 2/2004 | Tuffin et al. |
| 8,202,584 B2 | 6/2012 | Klasen-Memmer et al. |
| 8,394,293 B2 | 3/2013 | Jansen et al. |
| 8,486,297 B2 | 7/2013 | Jansen et al. |
| 8,871,952 B2 | 10/2014 | Lietzau et al. |
| 2020/0017768 A1* | 1/2020 | Khan ............... C09K 19/3497 |

FOREIGN PATENT DOCUMENTS

| EP | 467260 A2 | 1/1992 |
| JP | 2007084487 A | 4/2007 |
| WO | 1992016519 A2 | 10/1992 |

OTHER PUBLICATIONS

Han, J. et al., Synthesis and liquid crystal properties of a new class of calamitic mesogens based on substituted 2,5-diaryl-1,3,4-thiadiazole derivatives with wide mesomorphic temperature ranges, Liquid Crystals, 2008, 35(12), 1379-1394.
Seltmann, J. et al., Low-melting nematic V-shaped 1,3,4-thiadiazoles—phase engineering using small substituents and mixtures of flexible chains, Liquid Crystals, 2011, 38(4), 407-422.
Szczucinski, Ł. et al., Synthesis, mesogenic and dielectric properties of fluorosubstituted isothiocyanatoterphenyls, Liquid Crystals, 2015, 42(12), 1706-1729.
Rudolph, S.E. et al., Technologies for Smart Windows, ASHRAE Journal, 2009, 51(7), 104-107.
Cupelli, D. et al., Reverse Mode Operation Polymer Dispersed Liquid Crystal with a Positive Dielectric Anisotropy Liquid Crystal, Journal of Polymer Science Part B: Polymer Physics, 2011, 49(4), 257-262.
Sbar, N.L. et al., Electrochromic dynamic windows for office buildings, International Journal of Sustainable Built Environment, 2012, 1(1), 125-139.
Macchione, M. et al., Photochromic Reverse mode polymer dispersed liquid crystals, Liquid Crystals, 2005, 32(3), 315-318.
Di Profio, G. et al., Reverse-Mode Operation Switchable Nematic Emulsions, Langmuir, 2002, 18(8), 3034-3038.
Yamaguchi, R. et al., Electro-optical Properties and Morphology of Reverse Scattering Mode TN LCD, Journal of Photopolymer Science and Technology, 2012, 25(3), 313-316.
Chen, T.-J. et al., Electro-optical Properties of Reverse-Mode Films of Planar Aligned Polymer-Dispersed Liquid Crystal, Journal of Polymer Research, 2006, 13(2), 85-89.
International Search Report and Written Opinion, PCT/US2018/018252, dated Apr. 26, 2018.

* cited by examiner

*Primary Examiner* — Geraldina Visconti
(74) *Attorney, Agent, or Firm* — Maschoff Brennan; Brent A. Johnson; David W. Old

(57) ABSTRACT

Described herein are liquid crystal compositions containing a five-member heterocyclic ring that can allow for the adjustment of their refractive indices under the application of an electric field. In addition, selectively dimmable reverse-mode polymer dispersed liquid crystal elements and devices using the aforementioned compositions are also described, which are transparent when no voltage is applied and opaque when a voltage is applied.

14 Claims, 3 Drawing Sheets

Positive Dielectric Anisotropy

Negative Dielectric Anisotropy

Positive Dielectric Anisotropy

Negative Dielectric Anisotropy

LIQUID CRYSTAL COMPOSITION CONTAINING A FIVE-MEMBERED HETEROCYCLIC RING, REVERSE-MODE POLYMER DISPERSED LIQUID CRYSTAL ELEMENT, AND ASSOCIATED SELECTIVELY DIMMABLE DEVICE

CROSS REFERENCE TO RELATED APPLICATIONS

This application is a national phase application of PCT/US2018/018252, filed on Feb. 14, 2018, which claims the benefit of U.S. Provisional Application Nos. 62/458,971, filed on Feb. 14, 2017, and 62/569,400, filed on Oct. 6, 2017, the entire disclosures of which are incorporated by reference.

BACKGROUND

Field

These embodiments relate to compounds or compositions having both liquid and crystalline properties, as well as mixtures, elements, or devices using these compounds or compositions.

Description of the Related Art

In the field of windows, smart windows are attractive alternatives to conventional mechanical shutters, blinds, or hydraulic methods of shading. Currently, there are three main technologies for smart window applications: suspended particle displays (SPD), Polymer Dispersed Liquid Crystals (PDLCs), and metal oxide electrochromics (ECs).

One drawback of conventional PDLCs or conventional mode devices is that the window becomes transparent only when a voltage is applied, thus it fails passively opaque. Windows that fail opaque are not desirable in applications where visibility through the window would enhance safety when there is loss of power in an emergency situation such as in a vehicle or aircraft crash or in a building fire. For electrochromic windows, the application of a voltage is usually needed to trigger a change in the window characteristics, even though one may not be required to maintain dimming. As a result of the desire to have windows fail transparently, advances have been made to create reverse mode devices such as Reverse Mode PDLCs, or PDLCs that are transparent when off.

One way of creating reverse mode PDLCs has been found to be by using liquid crystal nematic compounds, having either negative dielectric anisotropy or positive dielectric anisotropy, and aligning them such that they are transparent in the off state. To meet demands for low driving voltage, there is a need for new liquid crystal materials to enable enhanced operation of reverse mode smart windows with low driving voltages.

SUMMARY

New materials have been successfully synthesized for use in reverse-mode PDLC materials. The material can be used in reverse mode PDLC dimmable devices. The materials can be integral to a window or applied as a coating to provide a dimming capability for privacy purposes among others.

These materials typically contain a substituted ethylene compound, such as a substituted ethylene compound comprising a heterocylic ring, including a heterocyclic five-membered ring, including compounds such as a substituted 1,1'-biphenyl]-4-yl)ethynyl)thiophene, a substituted 2-[1,1'-biphenyl]-4-yl)ethynyl)thiazole; a substituted 5-[1,1'-biphenyl]-4-yl)ethynyl)thiazole; or a substituted 5-((3,3',4'-trifluoro-[1,1'-biphenyl]-4-yl)ethynyl)-1,3,4-thiadiazole.

Some embodiments include a liquid crystalline composition comprising a first liquid crystalline compound represented by Formula 1:

wherein X is $C_{3-8}$ alkyl; Y is F, Cl, —$OCH_3$, $CH_3$, $CF_3$, or CN; Het is optionally substituted thienyl, optionally substituted thiazolyl, or 1,3,4-thiadiazolyl; and $Ph^1$ and $Ph^2$ are optionally substituted p-phenyl; wherein any substituents on Het, $Ph^1$, or $Ph^2$ are independently F, Cl, $OCH_3$, $CH_3$, $CF_3$, or CN.

Some embodiments include a liquid crystal element comprising: a transparency changing layer comprising the liquid-crystalline composition described herein, and having a first opposing surface and a second opposing surface, and a first alignment layer bounding the first opposing surface; and a second alignment layer bounding the second opposing surface.

Some embodiments include a selectively dimmable device comprising: a liquid crystal element described herein disposed between a first conductive substrate and a second conductive substrate; and a voltage source; wherein the liquid crystal element, the first conductive substrate, the second conductive substrate, and the voltage source are all in electrical communication such that when a voltage is applied by the voltage source an electric field is applied across the liquid crystal element.

DETAILED DESCRIPTION

Figure 1A:
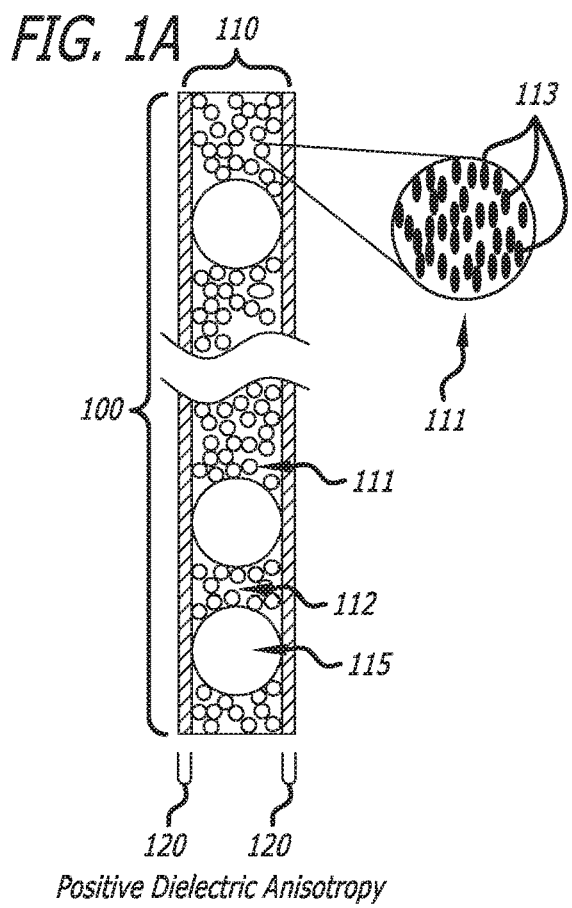
FIG. 1A is a schematic depiction of an embodiment of a liquid crystal element with a liquid crystal with positive dielectric anisotropy.

Unless otherwise indicated, when a compound or chemical structural feature, such as thienyl, thiazolyl, 1,3,4-thiadiazolyl, phenyl, etc., is referred to as being "optionally substituted," it includes a feature that has no substituents (i.e. unsubstituted), or a feature that is "substituted," meaning that the feature has one or more substituents. The term "substituent" includes a moiety that occupies a position normally occupied by one or more hydrogen atoms attached to a parent compound or structural feature. In some embodiments, a substituent may be an ordinary organic moiety known in the art, which may have a molecular weight (e.g. the sum of the atomic masses of the atoms of the substituent) of 15 g/mol to 50 g/mol, 15 g/mol to 100 g/mol, or 15 g/mol to 150 g/mol. In some embodiments, a substituent comprises, or consists of: 0-30, 0-20, 0-10, or 0-5 carbon atoms; and 0-30, 0-20, 0-10, or 0-5 heteroatoms, wherein each heteroatom may independently be: N, O, F, Cl, Br, or I; provided that the substituent includes one C, N, O, F, Cl, Br, or I atom. In some embodiments, the substituent is F, Cl, —OCH$_3$, CH$_3$, CF$_3$, or CN.

The structures associated with some of the chemical names referred to herein are depicted below. These structures may be unsubstituted, as shown below, or a substituent may independently be in any position normally occupied by a hydrogen atom when the structure is unsubstituted. Unless a point of attachment is indicated by

attachment may occur at any position normally occupied by a hydrogen atom.

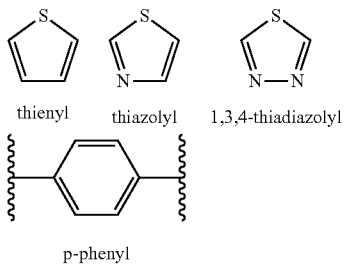

thienyl    thiazolyl    1,3,4-thiadiazolyl p-phenyl

With respect to any relevant structural representation, such as Formula 1, Ph$^1$ is optionally substituted p-phenyl, such as p-phenyl having 0, 1, 2, 3, or 4 substituents. In some embodiments, any substituents of p-phenyl may be F, Cl, C$_{1-6}$ —O-alkyl (such as —OCH$_3$, —OC$_2$H$_5$, —OC$_3$H$_7$, etc.), C$_{1-6}$ alkyl (such as CH$_3$, C$_2$ alkyl, C$_3$ alkyl, C$_4$ alkyl, C$_5$ alkyl, or C$_6$ alkyl), C$_{1-6}$ fluoroalkyl (such as CF$_3$, C$_2$ fluoroalkyl, C$_3$ fluoroalkyl, C$_4$ fluoroalkyl, C$_5$ fluoroalkyl, or C$_6$ fluoroalkyl), or CN. In some embodiments, any substituents on Ph$^1$ are independently F, Cl, —OCH$_3$, CH$_3$, CF$_3$, or CN.

In some embodiments, Ph$^1$ is:

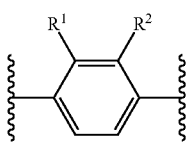

Moiety 1

With respect to any relevant structural representation, such as Formula 1, Ph$^2$ is optionally substituted p-phenyl, such as p-phenyl having 0, 1, 2, 3, or 4 substituents. In some embodiments, any substituents of p-phenyl may be F, Cl, C$_{1-6}$ —O-alkyl (such as —OCH$_3$, —OC$_2$H$_5$, —OC$_3$H$_7$, etc.), C$_{1-6}$ alkyl (such as CH$_3$, C$_2$ alkyl, C$_3$ alkyl, C$_4$ alkyl, C$_5$ alkyl, or C$_6$ alkyl), C$_{1-6}$ fluoroalkyl (such as CF$_3$, C$_2$ fluoroalkyl, C$_3$ fluoroalkyl, C$_4$ fluoroalkyl, C$_5$ fluoroalkyl, or C$_6$ fluoroalkyl), or CN.

In some embodiments, Ph$^2$ is:

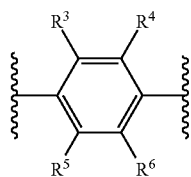

Moiety 2

Some compounds may be represented by Formula 2:

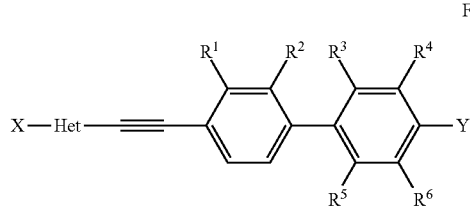

Formula 2

With respect to any relevant structural representation, such as Formula 1 or 2, Het is optionally substituted thienyl, such as thienyl having 0, 1, or 2 substituents, optionally substituted thiazolyl, such as thiazolyl, having 0 or 1 substituent(s), or 1,3,4-thiadiazolyl, such as unsubstituted 1,3,4-thiadiazolyl. In some embodiments, any substituents of thienyl or thiazolyl may be F, Cl, C$_{1-6}$ —O-alkyl (such as —OCH$_3$, —OC$_2$H$_5$, —OC$_3$H$_7$, etc.), C$_{1-6}$ alkyl (such as CH$_3$, C$_2$ alkyl, C$_3$ alkyl, C$_4$ alkyl, C$_5$ alkyl, or C$_6$ alkyl), C$_{1-6}$ fluoroalkyl (such as CF$_3$, C$_2$ fluoroalkyl, C$_3$ fluoroalkyl, C$_4$ fluoroalkyl, C$_5$ fluoroalkyl, or C$_6$ fluoroalkyl), or CN. In some embodiments, any substituents on Het are independently F, Cl, —OCH$_3$, CH$_3$, CF$_3$, or CN.

Some compounds may be represented by Formula 2, 3, 4, 5, 6, and/or 7:

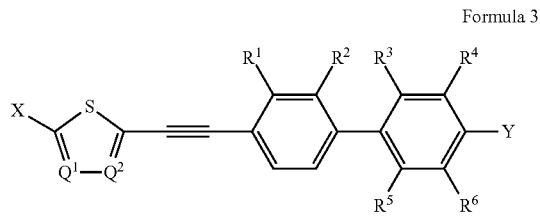

Formula 3

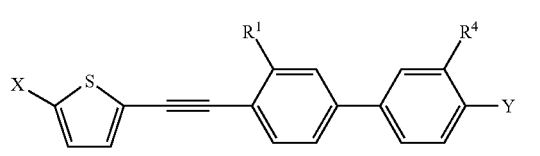

Formula 4

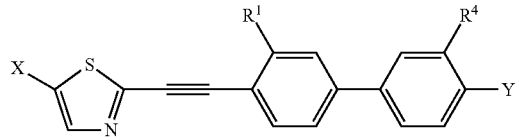

Formula 5

-continued

Formula 6

Formula 7

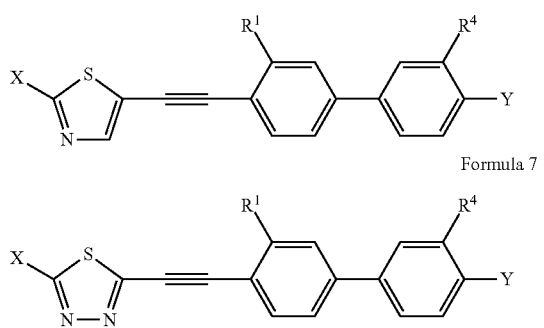

With respect to Formula 3, $Q^1$ is $CR^a$ or N, wherein $R^a$ is H, or any suitable substituent, such as F, Cl, —OCH$_3$, CH$_3$, CF$_3$, or CN. In some embodiments, $Q^1$ is CH. In some embodiments, $Q^1$ is NH.

With respect to Formula 3, $Q^2$ is $CR^b$ or N, wherein $R^b$ is H, or any suitable substituent, such as F, Cl, —OCH$_3$, CH$_3$, CF$_3$, or CN. In some embodiments, $Q^2$ is CH. In some embodiments, $Q^2$ is NH.

With respect to any relevant structural representation, such as Formula 1, 2, 3, 4, 5, 6, or 7, X is C$_3$-8 alkyl, such as C$_3$ alkyl, C$_4$ alkyl (such as —CH$_2$CH$_2$CH$_2$CH$_3$), C$_5$ alkyl (such as —CH$_2$CH$_2$CH$_2$CH$_2$CH$_3$), C$_6$ alkyl, C$_7$ alkyl, or C$_8$ alkyl. In some embodiments, X is

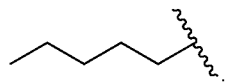 [SMILES: *CCCCC]

In some embodiments, X is

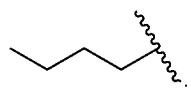

With respect to any relevant structural representation, such as Formula 1, 2, 3, 4, 5, 6, or 7, Y is F, Cl, OCH$_3$, CH$_3$, CF$_3$, or CN. In some embodiments, Y is F. In some embodiments, Y is Cl. In some embodiments, Y is OCH$_3$. In some embodiments, Y is CH$_3$. In some embodiments, Y is CF$_3$. In some embodiments, Y is CN.

With respect to any relevant structural representation, such as Formula 2, 3, 4, 5, 6 or 7, or Moiety 1, $R^1$ may be H, or any suitable substituent, such as F, Cl, —OCH$_3$, CH$_3$, CF$_3$, or CN. In some embodiments, $R^1$ is H or F. In some embodiments, $R^1$ is H. In some embodiments, $R^1$ is F.

With respect to any relevant structural representation, such as Formula 2 or 3, or Moiety 1, $R^2$ may be H, or any suitable substituent, such as F, Cl, —OCH$_3$, CH$_3$, CF$_3$, or CN. In some embodiments, $R^2$ is H or F. In some embodiments, $R^2$ is H. In some embodiments, $R^2$ is F.

With respect to any relevant structural representation, such as Formula 2 or 3, or Moiety 2, $R^3$ may be H, or any suitable substituent, such as F, Cl, —OCH$_3$, CH$_3$, CF$_3$, or CN. In some embodiments, $R^3$ is H or F. In some embodiments, $R^3$ is H. In some embodiments, $R^3$ is F.

With respect to any relevant structural representation, such as Formula 2, 3, 4, 5, 6, or 7, or Moiety 2, $R^4$ may be H, or any suitable substituent, such as F, Cl, —OCH$_3$, CH$_3$, CF$_3$, or CN. In some embodiments, $R^4$ is H or F. In some embodiments, $R^4$ is H. In some embodiments, $R^4$ is F.

With respect to any relevant structural representation, such as Formula 2 or 3, or Moiety 2, $R^5$ may be H, or any suitable substituent, such as F, Cl, —OCH$_3$, CH$_3$, CF$_3$, or CN. In some embodiments, $R^5$ is H or F. In some embodiments, $R^5$ is H. In some embodiments, $R^5$ is F.

With respect to any relevant structural representation, such as Formula 2 or 3, or Moiety 2, $R^6$ may be H, or any suitable substituent, such as F, Cl, —OCH$_3$, CH$_3$, CF$_3$, or CN. In some embodiments, $R^6$ is H or F. In some embodiments, $R^6$ is H. In some embodiments, $R^6$ is F.

In some embodiments, the composition can comprise:

[LC-1]

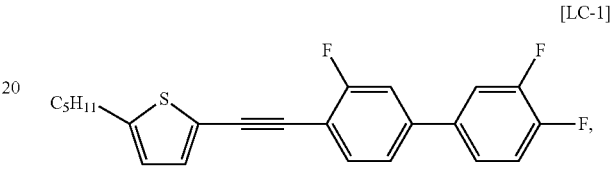

[LC-2]

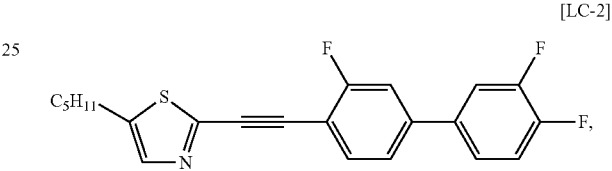

[LC-3]

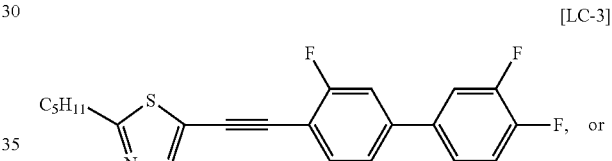

, or

[LC-4]

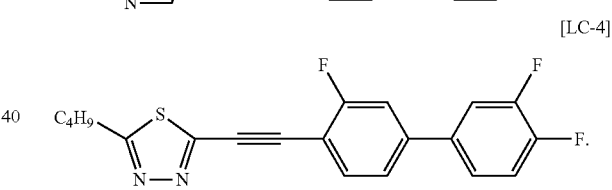

Some embodiments include optionally substituted 2-pentyl-5-((3,3',4'-trifluoro-[1,1'-biphenyl]-4-yl)ethynyl)thiophene; optionally substituted 5-pentyl-2-((3,3',4'-trifluoro-[1,1'-biphenyl]-4-yl)ethynyl)thiazole; optionally substituted 2-pentyl-5-((3,3',4'-trifluoro-[1,1'-biphenyl]-4-yl)ethynyl)thiazole; or 2-butyl-5-((3,3',4'-trifluoro-[1,1'-biphenyl]-4-yl)ethynyl)-1,3,4-thiadiazole.

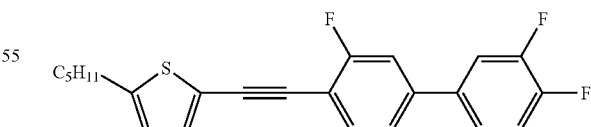

2-pentyl-5-((3,3',4'-trifluoro-[1,1'-biphenyl]-4-yl)ethynyl)thiophene

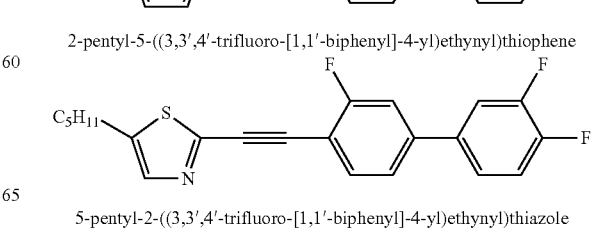

5-pentyl-2-((3,3',4'-trifluoro-[1,1'-biphenyl]-4-yl)ethynyl)thiazole

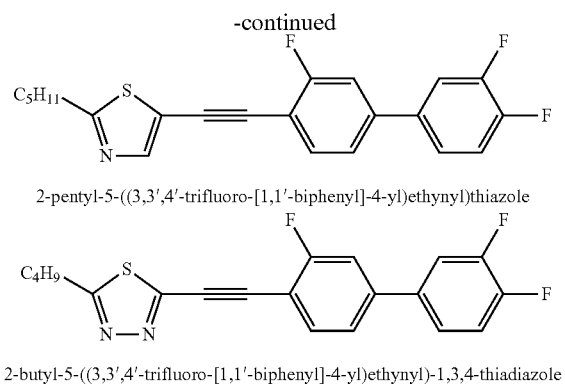

2-pentyl-5-((3,3',4'-trifluoro-[1,1'-biphenyl]-4-yl)ethynyl)thiazole 2-butyl-5-((3,3',4'-trifluoro-[1,1'-biphenyl]-4-yl)ethynyl)-1,3,4-thiadiazole Second Liquid-Crystalline Compound Additional liquid crystalline compounds may be used in a liquid crystalline mixture. These additional liquid crystalline compounds may be designated as a second liquid-crystalline compound, a third liquid crystalline compound, a fourth liquid crystalline compound, a fifth liquid crystalline compound, etc.

In some embodiments, an additional liquid crystal compound can be a nematic compound exhibiting positive dielectric anisotropy. In some embodiments, an additional liquid crystal compound can be a nematic compound exhibiting negative dielectric anisotropy. In some embodiments, a suitable additional liquid crystal compound can comprise Merck MLC-2142 (EMD Performance Materials, Philadelphia, Pa.), or Merck MLC-2132 (EMD Performance Materials).

Some additional liquid crystalline compounds may be represented by Formula 5

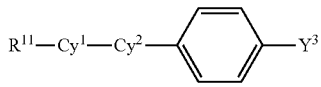

Formula 5

With respect to Formula 5, $R^{11}$ is $C_{3-9}$ alkyl, such as $C_3$ alkyl or $C_4$ alkyl, $C_5$ alkyl or $C_6$ alkyl, $C_7$ alkyl or $C_8$ alkyl, or $C_9$ alkyl; or $C_{3-9}$ —O-alkyl, such as $C_3$ —O-alkyl or $C_4$ —O-alkyl, $C_5$—O-alkyl or $C_6$ —O-alkyl, $C_7$ —O-alkyl or $C_8$ —O-alkyl, or $C_9$ —O-alkyl; or another substituent. In some embodiments, $R^{11}$ is $C_5$ alkyl, such as pentyl, e.g. —(CH$_2$)$_4$CH$_3$. In some embodiments, $R^{11}$ is $C_6$ alkyl, such as hexyl, e.g. —(CH$_2$)$_5$CH$_3$. In some embodiments, $R^{11}$ is $C_7$ alkyl, such as heptyl, e.g. —(CH$_2$)$_6$CH$_3$. In some embodiments, $R^{11}$ is $C_8$ —O-alkyl, such as —O-octyl, e.g. —O—(CH$_2$)$_7$CH$_3$.

With respect to Formula 5, $Cy^1$ is cyclohexyl or phenyl. In some embodiments, $Cy^1$ is cyclohexyl. In some embodiments, $Cy^1$ is phenyl.

With respect to Formula 5, $Cy^2$ is a single covalent bond or phenyl. In some embodiments, $Cy^2$ is a single covalent bond. In some embodiments, $Cy^2$ is phenyl.

With respect to Formula 5, $Y^3$ could be any substituent, including alkyl, —O— alkyl, a polar group such as CN or —NCS, or another substituent. In some embodiments, $Y^3$ is CN or —NCS. In some embodiments, $Y^3$ is CN. In some embodiments, $Y^3$ is —NCS. In some embodiments, $Y^3$ is an alkyl group In some embodiments, an additional liquid crystalline compound may be:

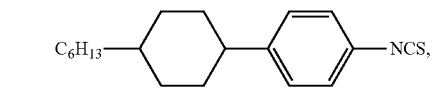

4-hexyl-4'-isothiocyanato-1,1'-biphenyl (6CHBT);

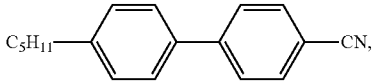

4'-pentyl-[1,1'-biphenyl]-4-carbonitrile (5CB);

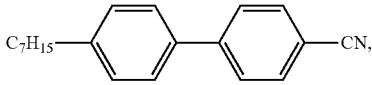

4'-heptyl-[1,1'-biphenyl]-4-carbonitrile (7CB);

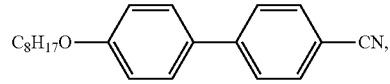

4'-(octyloxy)-[1,1'-biphenyl]-4-carbonitrile (8OCB);

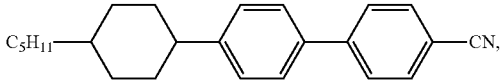

4'-(4-pentylcyclohexyl)-[1,1'-biphenyl]-4-carbonitrile (5CCB), or

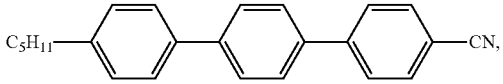

4''-pentyl-[1,1':4',1''-terphenyl]-4-carbonitrile (5CT).

In some mixtures, the mass percentage of 6CHBT can be from about 0-15 wt %, such as about 0.1-1 wt %, about 1-2 wt %, or about 2-3 wt %; about 3-4 wt %, about 4-5 wt %, or about 5-6 wt %; about 4-6 wt %; about 6-7 wt %, about 7-8 wt %, or about 8-9 wt %; about 9-10 wt %, about 10-11 wt %, or about 11-12 wt %; about 8-10 wt %; about 12-13 wt %, about 13-14 wt %, or about 14-15 wt %; about 15-16 wt %, about 16-17 wt %, about 17-18 wt %, about 18-19 wt %, or about 19-20 wt %; about 4-10 wt %; or about 20-25 wt %, with respect to the total mass of the liquid crystalline mixture.

For some mixture embodiments, the mass percentage of 5CB can be from about 0-70 wt %, such as about 1-10 wt %, about 10-20 wt %, or about 20-25 wt %; about 25-30 wt %, about 30-34 wt %, or about 34-36 wt %; about 36-38 wt % or about 38-40 wt %; about 40-60 wt %; about 45-55 wt %; about 40-41 wt %, about 41-42 wt %, or about 42-43 wt %; about 43-44 wt %, about 44-45 wt %, or about 45-46 wt %; about 46-47 wt %, about 47-48 wt %, about 48-49 wt %, about 49-50 wt %, or about 51-52 wt %; about 52-53 wt %, about 53-54 wt %, or about 54-55 wt %; about 55-56 wt %, about 56-57 wt %, about 57-58 wt %, about 58-59 wt %, or about 59-60 wt %; about 60-65 wt % or about 65-70 wt %; or about 45.5-61.7 wt %, etc., with respect to the total mass of the liquid crystalline mixture.

In some embodiments, the mass percentage of 7CB can be from about 0-30 wt %, such as about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %; about 20-30 wt %, about 20-23 wt %, about 23-27 wt %, or about 27-30 wt %; or about 4.4-25 wt %, etc., with respect to the total mass of the liquid crystalline mixture.

For some mixtures, the mass percentage of 5CCB can be from 0-18 wt %, such as about 4.5-17 wt %; about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %, etc., with respect to the total mass of the liquid crystalline mixture.

In some embodiments, the mass percentage of 5CT can be from about 0-20 wt %, such as about 8-20 wt %; about 0.1-1 wt %, about 1-2 wt %, or about 2-3 wt %; about 3-4 wt %, about 4-5 wt %, or about 5-6 wt %; about 6-7 wt %, about 7-8 wt %, or about 8-9 wt %; about 9-10 wt %, about 10-11 wt %, or about 11-12 wt %; about 12-13 wt %, about 13-14 wt %, or about 14-15 wt %; about 15-16 wt %, about 16-17 wt %, about 17-18 wt %, about 18-19 wt %, or about 19-20 wt %, etc., with respect to the total mass of the liquid crystalline mixture.

For some liquid crystalline mixtures, the mass percentage of MLC-2132 is about 70-72 wt %, about 72-74 wt %, about 74-76 wt %, about 76-78 wt %, about 78-80 wt %, about 80-81 wt %, about 81-82 wt %, about 82-83 wt %, about 83-84 wt %, about 84-85 wt %, about 85-86 wt %, about 86-87 wt %, about 87-88 wt %, about 88-89 wt %, about 89-90 wt %, about 90-91 wt %, about 91-92 wt %, about 92-93 wt %, about 93-97 wt %, about 93-94 wt %, about 94-95 wt %, about 95-96 wt %, about 96-97 wt %, about 98-99 wt %, etc., with respect to the total mass of the liquid crystalline mixture.

Liquid Crystal Element

Typically, a liquid crystal element comprises a transparency changing layer, a first alignment layer, and a second alignment layer. The transparency changing layer may comprise a liquid-crystalline composition described herein, and may have a first opposing surface and a second opposing surface. The first alignment layer may bound the first opposing surface, and the second alignment layer may bound the second opposing surface. In some embodiments, the transparency changing layer's opposing surfaces are also the transparency changing layer's surfaces that have the greatest surface areas.

In addition to a liquid crystalline composition, a transparency changing layer may further comprise a spacer, a dispersant, a plasticizer, a binder, and/or a solvent.

In some embodiments, a spacer can be used to control the thickness of the liquid crystal element (i.e. defining the gap between the two alignment layers and the conducting substrates). In some embodiments, the spacers provide structural support to ensure a uniform thickness of the liquid crystal element. In some embodiments, the spacers can be in the form of beads. In some embodiments, the spacers can comprise silica dioxide or glass, or a polymer, such as divinylbenzene, polymethylmethacrylate, polybuthymethacrylate, polymethylsilsesquioxane, polylaurylmethacrylate, polyurethane, polytetrafluoroethylene (Teflon), benzocyclobutene (BCB), amorphous fluoropolymer (Cytop), perfluorocyclobutene, or combinations thereof.

A bead may have any appropriate diameter depending upon the desired spacing characteristics sought. For example, the beads may have an average diameter of about 1-60 µm, about 1-50 µm, about 1-5 µm, about 10 µm or about 15 µm to about 20 µm or to about 50 µm; about 1-2 µm, about 2-3 µm, about 3-4 µm, about 4-5 µm, about 5-6 µm, about 6-7 µm, about 7-8 µm, about 8-9 µm, or about 9-10 µm; about 10-11 µm, about 11-12 µm, about 12-13 µm, about 13-14 µm, about 14-15 µm, about 15-16 µm, about 16-17 µm, about 17-18 µm, about 18-19 µm, or about 19-20 µm; about 20-21 µm, about 21-22 µm, about 22-23 µm, about 23-24 µm, about 24-25 µm, about 25-26 µm, about 26-27 µm, about 27-28 µm, about 28-29 µm, or about 29-30 µm; about 30-31 µm, about 31-32 µm, about 32-33 µm, about 33-34 µm, about 34-35 µm, about 35-36 µm, about 36-37 µm, about 37-38 µm, about 38-39 µm, or about 39-40 µm; about 40-41 µm, about 41-42 µm, about 42-43 µm, about 43-44 µm, about 44-45 µm, about 45-46 µm, about 46-47 µm, about 47-48 µm, about 48-49 µm, or about 49-50 µm; about 50-51 µm, about 51-52 µm, about 52-53 µm, about 53-54 µm, about 54-55 µm, about 55-56 µm, about 56-57 µm, about 57-58 µm, about 58-59 µm, or about 59-60 µm; or any combination thereof. In some embodiments, the spacers can be dispersed in a random distribution. In some embodiments, the spacers can be dispersed uniformly. In some embodiments, the liquid crystal element may contain spacers with an average spacer density ranging from about 10 spacers/in$^2$ to about 1000 spacers/in$^2$. In some embodiments, the liquid crystal element may contain spacers with an average spacer density of about 10 spacers/in$^2$, about 20 spacers in$^2$, about 25 spacers/in$^2$, about 50 spacers/in$^2$ to about 100 spacers/in$^2$, about 200 spacers/in$^2$, about 500 spacers/in$^2$, about 1000 spacers/in$^2$, or any combination thereof.

An alignment layer, such as a first alignment layer or a second alignment layer, is a layer that helps to align a liquid crystalline compound. The alignment layer may be composed of any suitable alignment material, or a material that can help with this alignment. In some embodiments, the alignment layers can comprise a polyimide, such as LX-1400.

Some liquid crystals may have positive dielectric anisotropy, negative dielectric anisotropy, or neutral dielectric anisotropy. In some embodiments, the liquid crystal mixture can comprise one or more compounds with positive dielectric anisotropy. In some embodiments, the liquid crystal mixture can comprise one or more compounds with negative dielectric anisotropy. In some embodiments, the liquid crystal mixture can comprise both a compound with positive dielectric anisotropy and a compound with negative dielectric anisotropy.

The dielectric anisotropy is related to dielectric properties as well as optical properties depending on the direction, either along the length of the molecule (or molecular axis), or perpendicular to the length of the molecule (or molecular axis). The dielectric properties depend on the molecular shape and substituent moieties and their locations on a given molecule.

Molecules with a positive dielectric anisotropy include molecules having a dielectric constant parallel to the length of the molecule that is greater than the dielectric constant perpendicular to the length of the molecule, where the length of a molecule is defined as the vector between the two furthest moieties. Molecules with a negative dielectric anisotropy include molecules having a dielectric constant perpendicular to the length of the molecule that is greater than the dielectric constant parallel to the length of the molecule, where the length of a molecule is defined as the vector between the two furthest moieties. Molecules with a neutral dielectric anisotropy include molecules having a dielectric constant perpendicular to the length of the molecule that is approximately the same as (e.g. a difference that is less than about 5% or less than about 1%) the dielectric constant parallel to the length of the molecule, where the length of a molecule is defined as the vector between the two furthest moieties.

In some embodiments, a liquid crystalline element is configured so that when a voltage is applied across the element, the liquid crystals will rotate from their pre-tilt positions in response to the application of an electric field. The change in orientation may result in a change of index of refraction due to the change in orientation of the individual molecules. The change in the liquid crystal index of refraction within the suspended liquid crystal droplets can result in an index of refraction mismatch between the droplets and the polymer. If the droplets are of an appropriate size, the index of refraction mismatch and the polymer can result in a haze or loss of transparency in the liquid crystalline element due to light scatter.

In addition to an alignment material, an alignment layer may further comprise a dispersant, a plasticizer, binder, and/or a solvent.

In some embodiments, the liquid crystal element can also comprise a dispersant such as an ammonium salt, e.g., $NH_4Cl$; Flowlen; fish oil; a long chain polymer; steric acid; oxidized Menhaden Fish Oil (MFO); a dicarboxylic acid, such as but not limited to, succinic acid, ethanedioic acid, propanedioic acid, pentanedioic acid, hexanedioic acid, heptanedioic acid, octanedioic acid, nonanedioic acid, decanedioic acid, o-phthalic acid, and p-phthalic acid; sorbitan monooleate; or a mixture thereof. In some embodiments, the dispersant can comprise oxidized MFO.

In some embodiments, the liquid crystal element can also comprise a plasticizer. A plasticizer can be type 1 plasticizers, that can generally decrease the glass transition temperature (Tg), and type 2 plasticizers that can enable more flexible, more deformable layers, and perhaps reduce the amount of voids resulting from lamination.

Type 1 plasticizers can include, but are not limited to: butyl benzyl phthalate, dicarboxylic/tricarboxylic ester-based plasticizers, such as but not limited to, phthalate-based plasticizers, such as but not limited to bis(2-ethylhexyl) phthalate, diisononyl phthalate, bis(n-butyl)phthalate, butyl benzyl phthalate, diisodecyl phthalate, di-n-octyl phthalate, diisooctyl phthalate, diethyl phthalate, diisobutyl phthalate, di-n-hexyl phthalate and mixtures thereof; adipate-based plasticizers, such as but not limited to, bis(2-ethylhexyl) adipate, dimethyl adipate, monomethyl adipate, dioctyl adipate and mixtures thereof; sebacate-based plasticizers, such as but not limited to, dibutyl sebacate, and maleate.

Type 2 plasticizers can include, but are not limited to: dibutyl maleate, diisobutyl maleate and mixtures thereof, polyalkylene glycols, such as but not limited to, polyethylene glycol, polypropylene glycol and mixtures thereof. Other plasticizers which may be used include, but are not limited to, benzoates, epoxidized vegetable oils, sulfonamides such as but not limited to N-ethyl toluene sulfonamide, N-(2-hydroxypropyl)benzene sulfonamide, N-(n-butyl)benzene sulfonamide, organophosphates, such as but not limited to, tricresyl phosphate, tributyl phosphate, glycols/polyethers, such as but not limited to, triethylene glycol dihexanoate, tetraethylene glycol diheptanoate and mixtures thereof; alkyl citrates, such as but not limited to, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate, alkyl sulphonic acid phenyl ester, and mixtures thereof.

In some embodiments, the liquid crystal element can also comprise a binder. In some embodiments, an organic binder can be used. In some embodiments, an organic binder comprises a vinyl polymer, such as but not limited to, polyvinyl butyral (PVB), polyvinyl alcohol (PVA), polyvinyl chloride (PVC), polyvinyl acetate (PVAc), polyacrylonitrile, a mixture thereof or a copolymer thereof; polyethyleneimine; poly methyl methacrylate (PMMA); vinyl chloride-acetate; and a mixture thereof. In some embodiments, the organic binder can comprise PVB.

In some embodiments, synthesizing the liquid crystal element can also include the use of a solvent, which may remain after synthesis of the liquid crystal element is completed. In some embodiments, the solvent can comprise a polar solvent, such as water or tetrahydrofuran (THF). In some embodiments, the polar solvent can comprise THF. In some embodiments, the solvent may comprise a non-polar solvent. In some embodiments, the non-polar solvent may be an organic solvent. In some embodiments, the non-polar solvent may include, but is not limited to, a lower alkanol, such as but not limited to, ethanol, methanol, isopropyl alcohol, xylenes, cyclohexanone, acetone, toluene and methyl ethyl ketone, and mixtures thereof. In some embodiments, the non-polar solvent may be toluene.

Figure 1B:
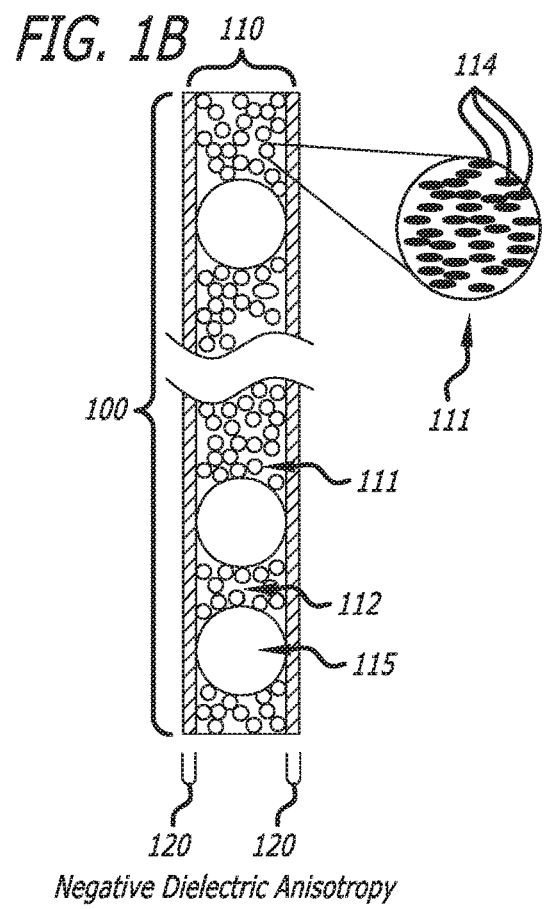
FIG. 1B is a schematic depiction of an embodiment of a liquid crystal element with a liquid crystal with negative dielectric anisotropy.

Some liquid crystal elements may be generally represented by FIG. 1A or FIG. 1B. In FIGS. 1A and 1B, a liquid crystal element, e.g. liquid crystal element 100, comprises a transparency changing layer 110, and at least two alignment layers 120. In the particular embodiments depicted by FIGS. 1A and 1B, the transparency changing layer has two opposing surfaces bounded by the two alignment layers 120.

In some embodiments, the transparency changing layer 110, can comprise any of the liquid crystal compositions described herein. As shown in FIG. 1A or 1B, some compositions can comprise a polymer and a liquid crystal mixture, where the mixture is dispersed within the transparency changing layer such that the mixture forms droplets 111, suspended within the polymer matrix 112. In some embodiments, as shown in FIG. 1A, the composition can comprise a liquid crystal mixture of one or more positive dielectric anisotropic compounds 113. Non-limiting examples of positive dielectric anisotropic compounds can be LC-1 through LC-4 described in detail elsewhere in this document. In some embodiments, as shown in FIG. 1B, the composition can comprise a mixture of one or more negative dielectric anisotropic compounds 114. In some embodiments, the composition can comprise a mixture of both a positive dielectric anisotropic compound and a negative dielectric anisotropic compound. In some embodiments, the transparency changing layer can further comprise spacers 115.

In some embodiments, the transparency changing layer can be described as a polymer dispersed liquid crystal (PDLC), where the liquid crystal mixture forms droplets within the polymer matrix. In some embodiments, the liquid crystal droplets form as suspended precipitate during the polymerization of the polymer precursors, and thus the liquid crystalline mixture is suspended as a precipitate within the polymer. In some embodiments, the droplets can have a uniform distribution, a gradient distribution, or a random distribution within the polymer matrix. In some embodiments, the droplets can have a uniform distribution within the polymer matrix.

In some embodiments, the liquid crystal element can be opaque to visible light but turn transparent upon the application of an electric field, or a normal mode PDLC. In some embodiments, the liquid crystal element can be transparent to visual light but opaque upon the application of an electric field, or a reverse mode element. In some embodiments, the liquid crystal element can be characterized as a reverse mode PDLC element.

In some embodiments, the liquid crystal element can also comprise a surfactant. In some embodiments, the surfactant can comprise octanoic acid, heptanoic acid, hexanoic acid, and/or combinations thereof. In some embodiments, the surfactant can comprise acetylenic diol-based compounds, such as, for example, tetramethyl decynediol in a 2-ethyl hexanol solvent (Surfynol® 104A), ethoxylated acetylenic diols (Dynol® 604), dodecylbenzene sulfonate (Witconate® P-1059), Witcoamide® 511, Witcoamide® 5138, Surfynol® CT-171, Surfynol® CT-111, Surfynol® CT-131, Surfynol® TG, DBE Microemulsion, Fluorad® FC-431, Fluorad® FC-430, Surfynol® 104A, Dynol® 604, or combinations thereof.

Selectively Dimmable Device

A liquid crystal element may be incorporated into a selectively dimmable device. The selectively dimmable device can comprise the liquid crystal element disposed between a first conductive substrate and a second conductive substrate. A selectively dimmable device also includes a voltage source which is configured so that the substrates, the element, and the voltage source are all in electrical communication such that when a voltage is applied by the voltage source an electric field is applied across the liquid crystal element.

A conductive substrate can comprise a base, which comprises a conductive material, such as a conductive polymer.

In some embodiments, each conductive substrate can further comprise an electron conduction layer which is in physical communication with the base. In some embodiments, the electron conduction layer is placed in direct physical contact with the base, such as a layer on top of the base. In other embodiments, the electron conduction layer may be impregnated directly into the base (e.g. ITO glass), or sandwiched in between two bases to form a single conductive substrate. In some embodiments, the electron conduction layer can comprise a transparent conductive oxide, a conductive polymer, a metal grid, carbon nanotubes (CNT), graphene, or a combination thereof. In some embodiments, the transparent conductive oxide can comprise a metal oxide. In some embodiments, the metal oxide can comprise iridium tin oxide (IrTO), indium tin oxide (ITO), fluorine doped tin oxide (FTO), doped zinc oxide, or combinations thereof. In some embodiments, the metal oxide can comprise indium tin oxide incorporated onto the base, e.g. ITO glass, ITO PET, or ITO PEN.

Figure 2:
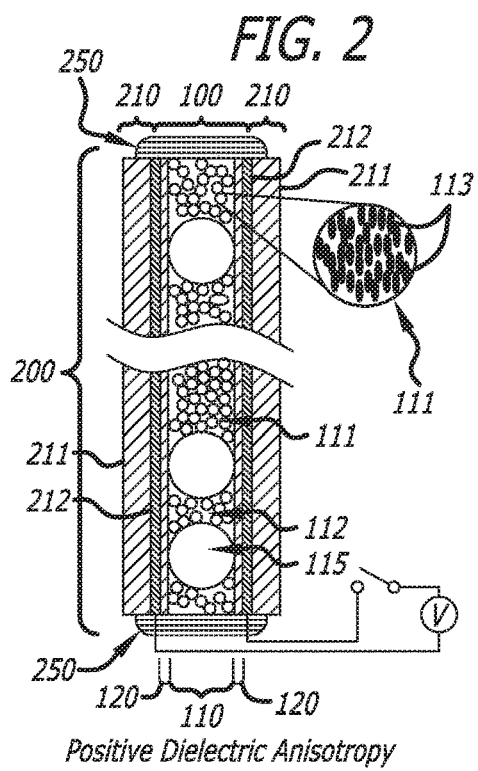
FIG. 2 is a schematic depiction of an embodiment of a selectively dimmable device with a positive dielectric anisotropic polymer dispersed liquid crystal.
Figure 3:
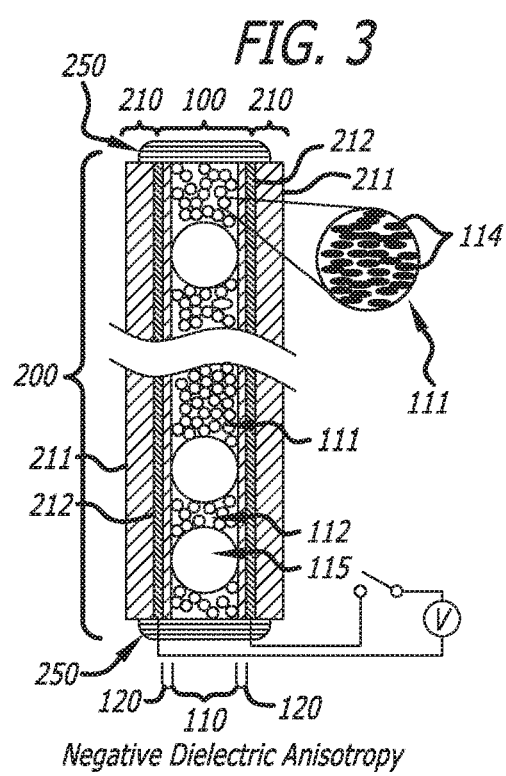
FIG. 3 is a schematic depiction of an embodiment of a selectively dimmable device with a negative dielectric anisotropic polymer dispersed liquid crystal.

FIGS. 2 and 3 schematically depict the structure of some embodiments of a selectively dimmable device, e.g. selectively dimmable device 200. Selectively dimmable device 200 can include conductive substrates, such as conductive substrates 210, liquid crystal element 100 and a voltage source. Liquid crystal element 100 may be disposed in a gap between two conductive substrates 210. In some embodiments, liquid crystal element 100, conductive substrates 210, and the voltage source are all in electrical communication such that upon the application of a voltage from the voltage source, an electric field is applied across liquid crystal element 100.

In some embodiments, the conductive substrates can each comprise a base, e.g. base 211, where the base can be conductive. In some embodiments, each conductive substrate can further comprise an electron conductive layer, e.g. electron conductive layer 212, which is in physical contact with the base.

Figure 4:
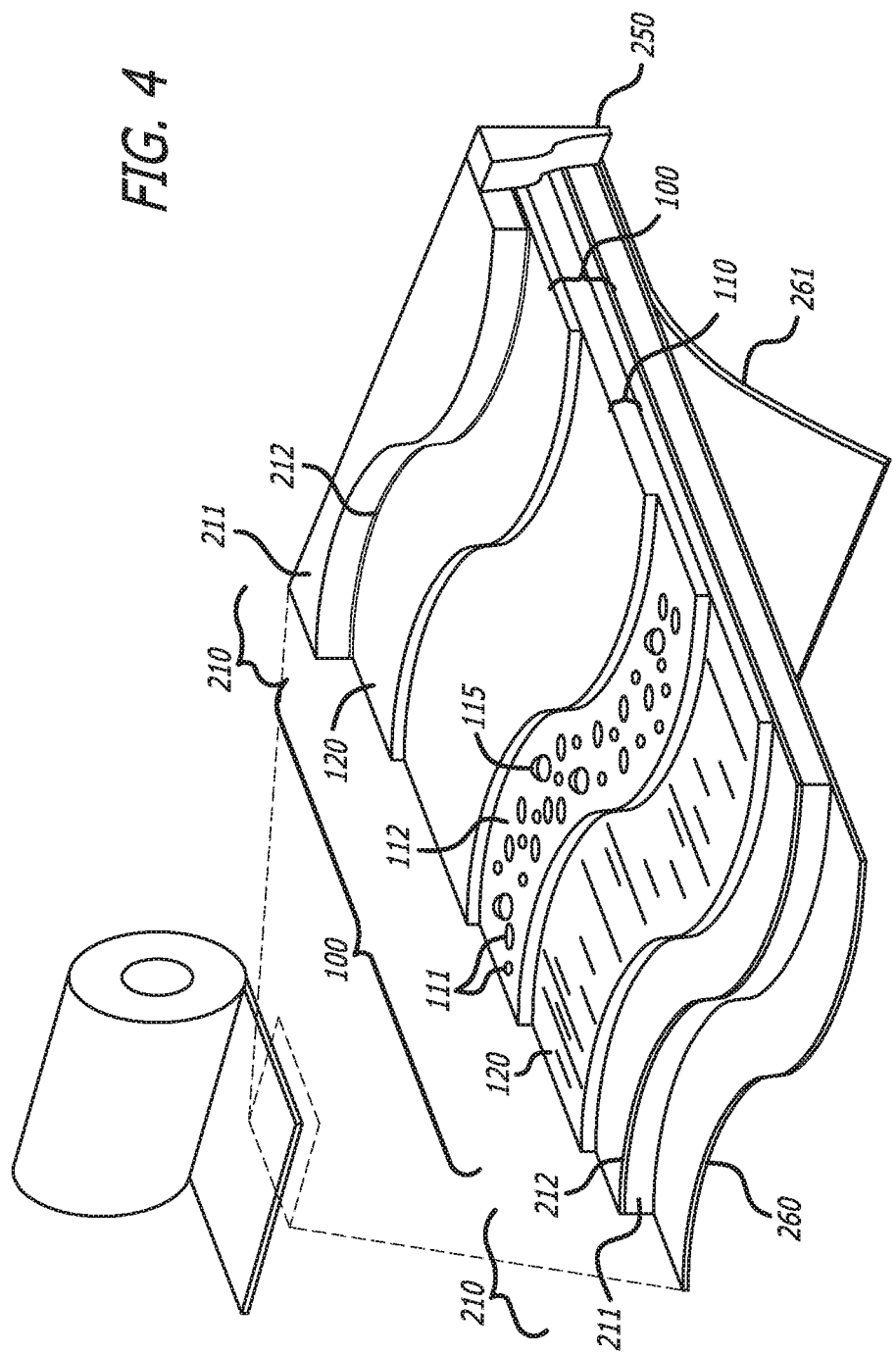
FIG. 4 is a schematic depiction of an embodiment of a selectively dimmable device where the device comprises of a flexible film.

In some embodiments with electron conduction layers, the base can be non-conductive. In some embodiments, the device can further comprise a sealant, e.g. sealant 250, to protect the liquid crystal element from the environment. As depicted in FIG. 4, in some embodiments, the device can further comprise an adhesive layer 260, and a removable backing 261, to allow application to existing windows.

As shown in FIGS. 2 and 3, in some embodiments of the device the liquid crystal element is integrated into the device 100, and can comprise a polymer matrix 112 in which the polymer dispersed liquid crystal droplets 111 are suspended and all bound by two alignment layers 120. In some embodiments of the device, as shown in FIG. 2, the liquid crystal droplets can comprise a positive dielectric anisotropic compound 113. In other embodiments of the device, as shown in FIG. 3, the liquid crystal droplets can comprise a negative dielectric anisotropic compound 114. In still other embodiments, the liquid crystal droplets can comprise a combination of positive and negative dielectric anisotropic compounds.

In some embodiments of the device, the liquid crystal element can be chosen such that under a condition when there is no induced electric field present within the transparency changing layer, the index of refraction of the liquid crystal composition and the index of refraction of the polymer are similar relative to each other so that the total transmission of visible light allowed to pass through the device can be at least about 70%, at least about 75%, at least about 80%, at least about 85%, at least about 90%, and/or at least about 95%.

In some embodiments, when there is an electric field present, e.g. due to a voltage applied to the electrical circuit, the index of refraction of the liquid crystal and the index of refraction of the polymer can vary relative to each other so that incident light is scattered and at most only about 70%, only about 65%, only about 60%, only about 50%, only about 30%, only about 25%, only about 15%, only about 10%, or only about 5% of visible light is allowed to pass through the device. In some embodiments, the magnitude of the electric field necessary to achieve scattering corresponds to applying a voltage of less than 120 V, less than 110 V, less than 50 V, less than 20 V, less than 15 V, less than 12 V, less than 10 V, or less than 5V across the device. Across the device is the direction normal to the plane of the display, or from a first conductive substrate to a second conductive substrate. In some embodiments, the electric field across the device is less than about 500 kV/m, less than about 1,000 kV/m, less than about 5,000 kV/m, less than about 10,000 kV/m, less than about 20,000 kV/m, or less than about 40,000 kV/m to less than about 80,000 kV/m. While not wanting to be limited by theory, the effectiveness of dimming of the device can also be depicted in terms of percentage of haze, which generally can be defined as:

$$\text{Haze}[\%] = \frac{\text{Total Light Transmitted} - \text{Diffuse Light Transmitted}}{\text{Total Light Transmitted}} \times 100\%,$$

where the total light transmitted is the light from a known source and the diffuse light transmitted is the light transmitted through the element. In some embodiments, the haze of the device can be a maximum of about 4.5%, about 5%, about 7%, about 8%, about 10%, about 15%, about 20%, about 25%, or about 30% when a voltage of 0 volts, less than about 2 volts, less than about 4 volts, less than about 5 volts, or any combination of the aforementioned values, is applied to the device.

In some embodiments, the haze of the device can be at least about 20%, about 25%, about 28%, about 30%, about 35%, about 40%, about 50%, about 70%, about 75%, about 85%, about 90%, or about 95%, when a voltage of less than 15 volts, 30 volts, 40 volts, or less than 60 volts is applied to achieve scattering.

In some embodiments, the device can be characterized as having a long endurance when exposed to an extended continuous duty cycle or multiple cyclic duty cycles. In some embodiments, the device can sustain operation with a relative increase of off-mode haze of at most about 250%, about 230%, about 200%, about 100%, or about 70% when the device has been operated continuously for at least about 30 hours, about 40 hours, about 50 hours, about 60 hours, about 64 hours, about 70 hours, about 80 hours, or any combination of the aforementioned values. In some embodiments, the device can sustain cyclic operation with a relative increase of off-mode haze of at most about 200%, about 180%, about 160%, about 155%, or about 50% after about 1,000 cycles, 5,000 cycles, 7,000 cycles, 10,000 cycles, or any combination of the aforementioned values. One cycle refers to cycling the device on at 20 volts for 10 seconds and then off at zero volts for 10 seconds.

In some embodiments, the device can be semi-rigid or rigid. In some embodiments, the device can be flexible. A device is flexible if it can have a radius of curvature of 10,000 mm without withstanding material failure (e.g. fractures and delamination). In some embodiments, a selectively dimmable device can form a flexible sheet, as shown in FIG. 4, which can be applied between or on the surface of preexisting windows. In some embodiments, the conductive substrates can comprise flexible materials so that the aforementioned device may be a flexible film. In some embodiments, the flexible device may be placed in between or on one side of pre-existing window glass to provide a dimming capability. In other embodiments, the device can be rigid, with the base comprising inflexible materials.

In some embodiments, as shown in FIGS. 2 and 3, the selectively dimmable device can also comprise a sealant 250. In some embodiments, the sealant can encapsulate the liquid crystal element between the conductive substrates to protect the element from the environment. In some embodiments, the sealant can comprise a two-part real time cure epoxy, such as 3-Bond 2087, or the like. In some embodiments, the sealant can comprise a UV-curable photopolymer, such as NOA-61, or the like. In some embodiments, as shown in FIG. 4, the selectively dimmable device can also comprise an adhesive layer 260. In some embodiments, the adhesive layer will allow a flexible sheet embodiment of the aforementioned device to be installed on pre-existing windows. In some embodiments, the adhesive can comprise an optically clear adhesive (OCA). In some embodiments, the OCA can comprise OCA products commercially available and known to those skilled in the art (e.g. Nitto OCA tape, Scapa OCA tape). In some embodiments, the selectively dimmable device can also comprise a removable carrier substrate 261 to protect the adhesive layer from contamination which will be peeled away before the device's application.

EXAMPLES

It has been discovered that embodiments of the liquid crystal composition and related reverse-mode polymer dispersed liquid crystal elements and devices described herein provide the ability for a selectively dimmable surface. These benefits are further shown by the following examples, which are intended to be illustrative of the embodiments of the disclosure, but are not intended to limit the scope or underlying principles in any way.

In general, the preparation of the compounds was performed in an argon atmosphere (Airgas, San Marcos, Calif. USA) inside a fume-hood. In addition, where degassing is mentioned, it can be performed by bubbling of argon (Airgas) through the compound or other similar methods.

Example 1.1: Synthesis of Precursor #1 (P-1)

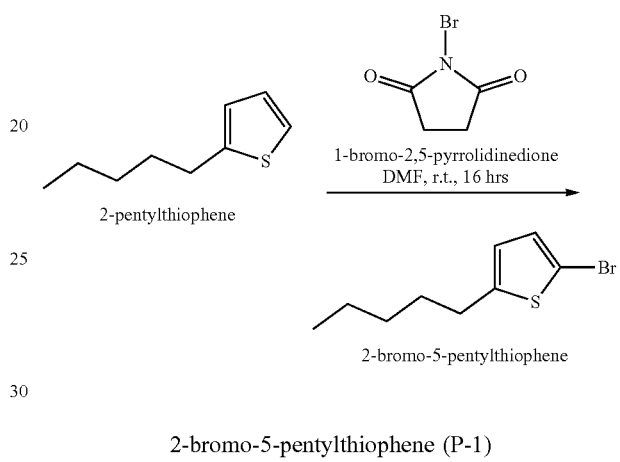

2-bromo-5-pentylthiophene (P-1)

To a stirring solution of 2-pentylthiophene (5.0 g, 32.41 mmol; Sigma Aldrich, St. Louis, Mo. USA) and dimethylformamide (DMF) (60 mL, anhydrous; Aldrich) was slowly added 1-bromo-2,5-pyrrolidinedione (N-Bromosuccinimide (NBS)) (5.77 g, 32.4 mmol; Aldrich) at room temperature. The resulting mixture was then stirred at room temperature for 16 hours. Then DI water (240 mL) was added to the mixture, followed by ethyl acetate (300 mL; Aldrich). The organic layer was then separated and dried with $MgSO_4$ (Aldrich) to yield P-1 (7.5 g, yield 99%).

Example 1.2: Synthesis of Precursor #2 (P-2)

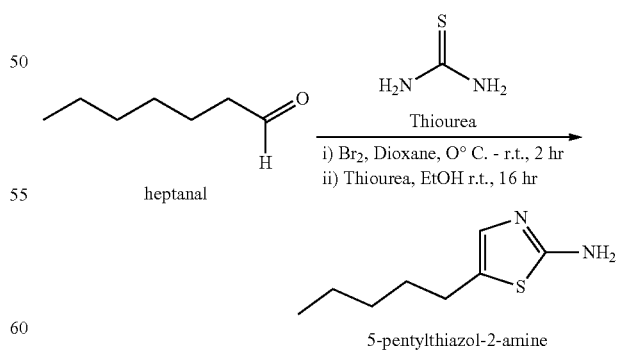

5-pentylthiazol-2-amine (IC-1)

To a stirring solution of heptanal (12.997 mL, 93 mmol; TCI Fine Chemicals, Portland Oreg. USA) and dioxane (75 mL; Aldrich), bromine (202 mL, 2% (v/v) sol. in dioxane; Aldrich) was added dropwise in an ice bath and then left to heat to room temperature for 2 hours. Then to the mixture was added thiourea (14.15 g, 93 mmol; Combi-Blocks, Inc., San Diego, Calif. USA) and ethanol (25 mL; Aldrich). The resulting mixture was then stirred for 16 hours and then evaporated to dryness. The residue was dissolved in dichloromethane (DCM) (200 mL; Aldrich) and extracted into an HCl aqueous solution (50 mL, 1M; Aldrich); the aqueous layer was separated, and then neutralized with ammonium hydroxide (1M; Aldrich). The resulting solution was then extracted again with DCM (200 mL; Aldrich). The organic layer was then separated and dried with MgSO$_4$ (Aldrich). The crude product was then purified by flash column with silica gel (Aldrich), eluting with hexanes:ethyl acetate (1:1) (Aldrich) to gain a light brown color solid product, IC-1 (5.0 g, 31% yield).

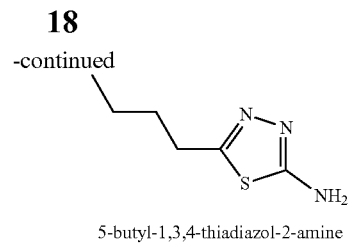

5-butyl-1,3,4-thiadiazol-2-amine 5-butyl-1,3,4-thiadiazol-2-amine (IC-4)

To hydrazinecarbothio-amide (8.09 g, 88.82 mmol; Combi-Blocks, Inc.) was added pentanoyl chloride (10.7 mL, 88.82 mmol; Aldrich) while stirring in an ice bath. The resulting solution was then stirred at 60° C. for 4 hours. The mixture was then washed with NH$_4$OH aqueous solution (50 mL, saturated; Aldrich) and then rinsed with DI water (100 mL). The solid product was gained by filtration to yield IC-4 (14.9 g, 98% yield).

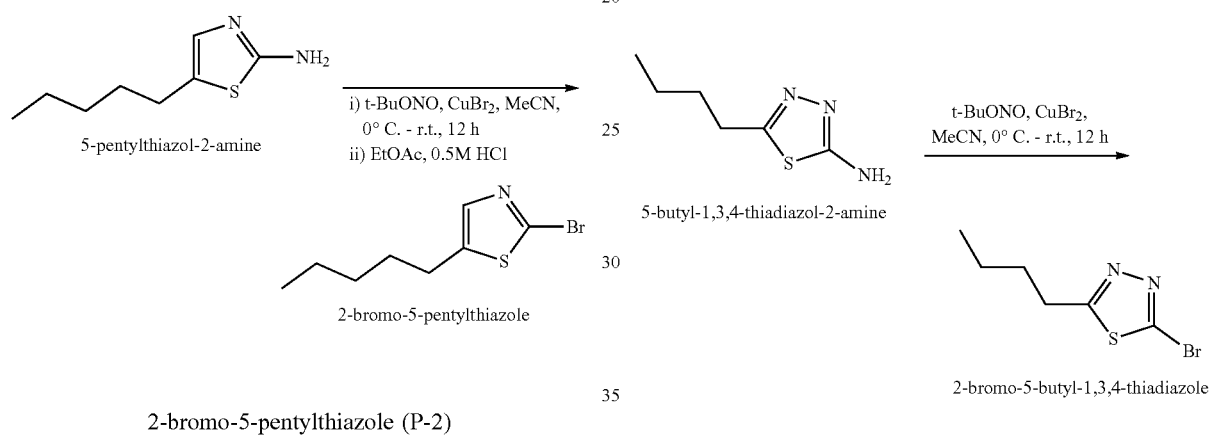

2-bromo-5-pentylthiazole (P-2)

To a stirring suspension mixture of IC-1 (5.0 g, 29.36 mmol) in acetonitrile (60 mL, Aldrich) was added copper (II) bromide (7.85 g, 35.21 mmol; Aldrich) followed by tert-butyl nitrite (4.64 mL, 35.21 mmol; Aldrich) in an ice bath. The reaction was left to warm to room temperature and stirred for 12 hours. The resulting mixture was then concentrated in vacuo and diluted in ethyl acetate (200 mL; Aldrich) was added followed by HCl aqueous solution (30 mL, 0.5 M; Aldrich). The resulting organic layer was separated, washed with brine, and dried with MgSO$_4$ (Aldrich). The crude product was purified by flash column with silica gel (Aldrich), eluting with hexanes:ethyl acetate (9:1) (Aldrich) to gain a light brown solid product P-2 (5.7 g; 82% yield).

Example 1.3: Synthesis of Precursor #4 (P-4)

2-bromo-5-butyl-1,3,4-thiadiazole (P-4)

To a stirring suspension mixture of IC-4 (8.29 g, 52.72 mmol) in acetonitrile (100 mL, anhydrous; Aldrich) was added copper (II) bromide (12.95 g, 57.97 mmol; Aldrich) followed by tert-butyl nitrite (7.663 mL, 58.15 mmol; Aldrich) while being stirred in an ice bath. The reaction was left to warm to room temperature and stirred for 12 hours. The resulting mixture was then concentrated in vacuo and ethyl acetate (200 mL; Aldrich) was added followed by HCl aqueous solution (30 mL, 0.5 M; Aldrich). The resulting organic layer was separated, washed with brine, and dried with MgSO$_4$ (Aldrich). The crude product was purified by flash column with silica gel (Aldrich), eluting with hexanes: ethyl acetate (9:1) (Aldrich) to gain a light brown solid product P-4 (8.77 g; 82% yield).

Example 1.4 Synthesis of Precursor #5 (P-5)

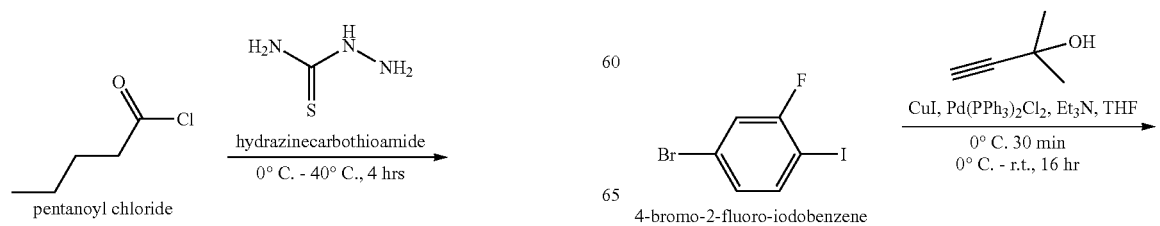

-continued

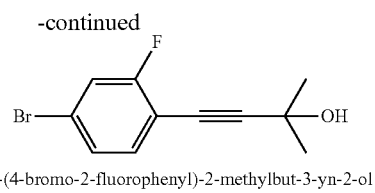

4-(4-bromo-2-fluorophenyl)-2-methylbut-3-yn-2-ol

4-(4-bromo-2-fluorophenyl)-2-methylbut-3-yn-2-ol (IC-7)

To a mixture of 4-bromo-2-fluoro-1-iodobenzene (24.46 g, 81.12 mmol; Aldrich), Pd$_2$(PPh$_3$)$_2$Cl$_2$ (569 mg, 0.81 mmol, Aldrich), CuI (0.46 g, 2.43 mmol, Aldrich), TEA (16.41 g, 162 mmol, Aldrich) in THF (100 mL; Aldrich) in an ice bath was added 2-methyl-3-butyn-2-ol (6.83 g, 81.1 mmol) dropwise. The resulting mixture was stirred at 0° C. while in the ice bath for 30 minutes. Then the mixture was allowed to warm to room temperature and then stirred for an additional 16 hours. The mixture was then poured into DI water (200 mL) and then extracted into ethyl acetate (200 mL; Aldrich). The organic layer was then filtered off and concentrated, and dried over MgSO$_4$ (Aldrich). A dark crude product IC-7 was obtained which was used without further purification (20 g, yield 100%).

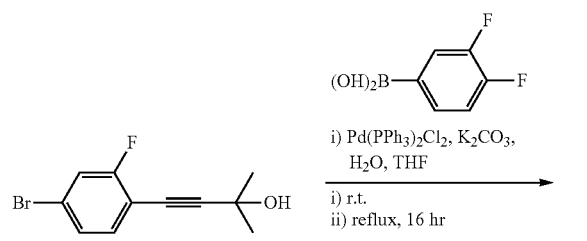

2-methyl-4-(3',4'-trifluoro-(1,1'-biphenyl)-4-yl)-but-3-yn-2-ol (IC-8)

To a solution of mixture of potassium carbonate (22.4 g, 162.2 mmol; Aldrich) in DI water (20 mL) was added a mixture of IC-7 (20.85 g, 81.12 mmol), Pd$_2$(PPh$_3$)$_2$Cl$_2$ (1.138 g, 1.622 mmol; Aldrich), (3,4-difluorophenyl)boronic acid (15.37 g, 97.34 mmol; Aldrich) in THF (200 mL; Aldrich) at room temperature. The resulting mixture was then refluxed for 16 hours. After cooling to room temperature, the mixture was diluted with ethyl acetate (200 mL; Aldrich). The water layer was separated, the organic layer was washed with brine, dried over MgSO$_4$ (Aldrich) and concentrated. The resulting residue was purified via flash chromatography on silica gel (Aldrich) eluting with hexanes:ethyl acetate (9:1) (Aldrich) to gain a pale solid product IC-8 (18.96 g. 80.5% yield).

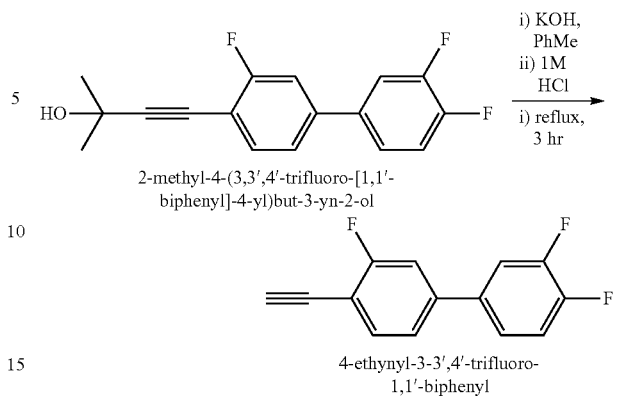

4-ethynyl-3,3',4'-trifluoro-1,1'-biphenyl (P-5)

A mixture of IC-8 (18.96 g, 65.53 mmol) and potassium hydroxide (3.66 g, 65.53 mmol; Aldrich) in toluene (650 mL; Aldrich) was stirred and then refluxed for 3 hours. After 3 hours, the mixture was then poured into an HCl aqueous solution (100 mL, 1M; Aldrich). The resulting product was then extracted with ethyl acetate (200 mL; Aldrich), the organic layer separated, dried over MgSO$_4$ (Aldrich) and concentrated. The crude product was purified via flash chromatography on silica gel (Aldrich) eluting with hexanes:ethyl acetate (95:5) (Aldrich) to gain a colorless solid, P-5 (11.41 g, 75% yield).

Example 2.1: Synthesis of Liquid Crystal Compound #1 (LC-1)

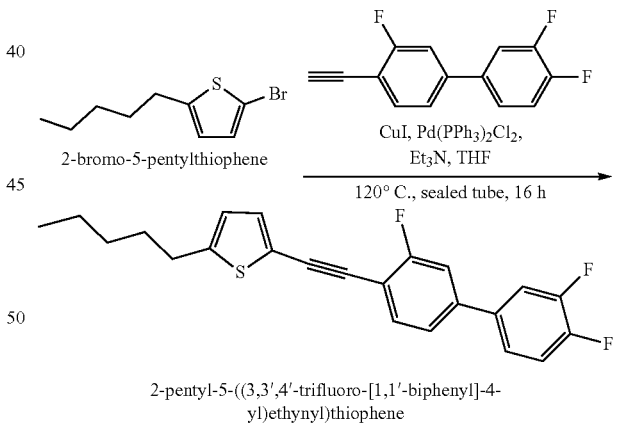

2-pentyl-5-((3,3',4'-trifluoro-[1,1'-biphenyl]-4-yl) ethynyl)thiophene (LC-1)

A mixture of CuI (14.37 mg, 0.075 mmol, Aldrich), Pd$_2$(PPh$_3$)$_2$Cl$_2$ (44.92 mg, 0.064 mmol, Aldrich), P-1 (0.492 g, 2.11 mmol), P-5 (0.54 g, 2.32 mmol), and TEA (1.145 g, 14.32 mmol; Aldrich) in THF (5 mL, anhydrous; Aldrich) was placed in a sealed tube and then stirred at 120° C. for 16 hours. After cooling to room temperature, the mixture was then quenched in DI water (100 mL) and then extracted into ethyl acetate (200 mL; Aldrich). The organic layer was separated, dried over MgSO$_4$ (Aldrich) and concentrated. The crude product was purified via flash chromatography on silica gel (Aldrich) eluting with hexanes:DCM (95:5) (Aldrich). The product was then recrystallized from ethanol (Aldrich) to gain colorless crystals, LC-1 (0.130 g, 16% yield). LCMS M+H=385. $^1$H NMR (500 MHz) (DMSO) ppm 7.53 (t, J=8 Hz, 1H), 7.38-7.28 (m, 1H), 7.27-7.23 (m, 4H), 7.15 (d, J=3.5 Hz, 1H), 6.69 (d, J=3.5, 1H), 2.8 (t, J=7.5 Hz, 2H), 1.72-1.66 (m, 2H), 1.37-1.34 (m, 4H), 0.91 (t, J=7 Hz, 3H)

Example 2.2: Synthesis of Liquid Crystal Compound #2 (LC-2)

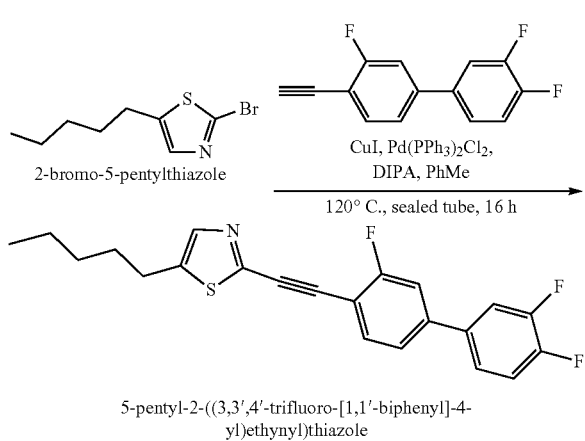

5-pentyl-2-((3,3',4'-trifluoro-[1,1'-biphenyl]-4-yl)ethynyl)thiazole (LC-2)

A mixture of CuI (15 mg, 0.078 mmol, Aldrich), Pd$_2$(PPh$_3$)$_2$Cl$_2$ (30 mg, 0.042 mmol, Aldrich), P-2 (0.625 g, 2.67 mmol), P-5 (0.62 g, 2.67 mmol), and diisopropylamine (DIPA) (1.228 mL; Aldrich) in toluene (10 mL, anhydrous; Aldrich) was placed in a sealed tube and then stirred at 120° C. for 16 hours. After cooling to room temperature, the mixture was then quenched in DI water (100 mL) and then extracted into ethyl acetate (200 mL; Aldrich). The organic layer was separated, dried over MgSO$_4$ (Aldrich) and concentrated. The crude product was purified via flash chromatography on silica gel (Aldrich) eluting with hexanes:DCM (95:5) (Aldrich). The product was then recrystallized from ethanol (Aldrich) to gain colorless crystals, LC-2 (0.230 g, 22% yield). LCMS M+H=386. $^1$H NMR (500 MHz) (DMSO) ppm 7.96-7.91 (m, 1H), 7.82-7.73 (m, 2H), 7.73 (s, 1H), 7.58-7.53 (m, 1H), 2.88 (t, J=7.5 Hz, 2H), 1.66-1.60 (m, 2H), 1.32-1.29 (m, 4H), 0.87 (t, J=7 Hz, 3H)

Example 2.3: Synthesis of Liquid Crystal Compound #4 (LC-4)

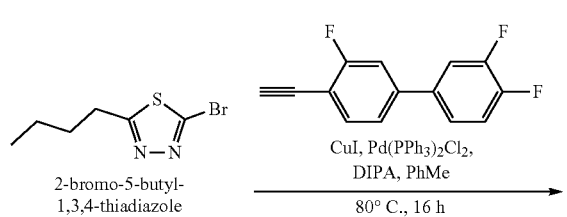

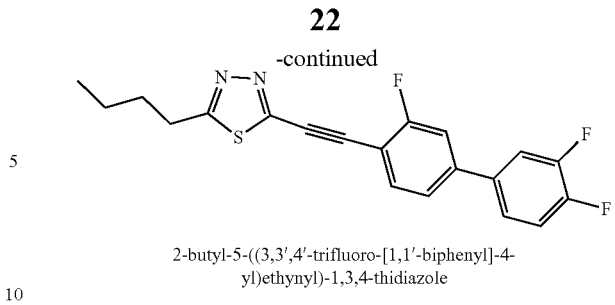

2-butyl-5-((3,3',4'-trifluoro-[1,1'-biphenyl]-4-yl)ethynyl)-1,3,4-thiadiazole (LC-4)

A mixture of CuI (184 mg, 0.967 mmol, Aldrich), Pd$_2$(PPh$_3$)$_2$Cl$_2$ (226 mg, 0.322 mmol, Aldrich), P-4 (1.783 g, 8.064 mmol), P-5 (2.06 g, 8.871 mmol), and diisopropylamine (DIPA) (15 mL; 107 mmol; Aldrich) in toluene (10 mL, anhydrous; Aldrich) was then stirred at 80° C. for 16 hours. After cooling to room temperature, the mixture was then quenched in DI water (100 mL) and then extracted into ethyl acetate (200 mL; Aldrich). The organic layer was separated, dried over MgSO$_4$ (Aldrich) and concentrated. The crude product was purified via flash chromatography on silica gel (Aldrich) eluting with hexanes:DCM (95:5) (Aldrich). The product was then recrystallized from ethanol (Aldrich) to gain colorless crystals, LC-4 (0.56 g, <7% yield).

Comparative Example 2.4: Synthesis of Comparative Liquid Crystal #1 (CLC-1)

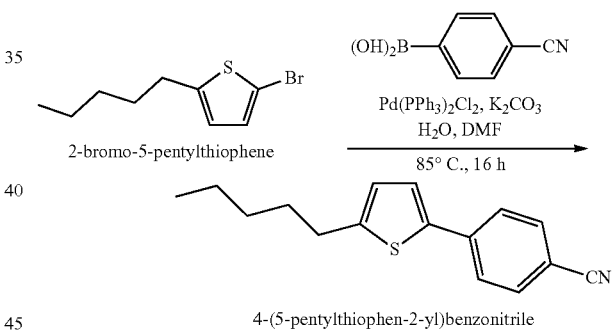

4-(5-pentylthiophen-2-yl)benzonitrile (CLC-1)

A solution mixture of potassium carbonate (1.77 g, 12.8 mmol; Aldrich) in DI water (5 mL) was added to a mixture of P-1 (1.51 g, 6.42 mmol), Pd$_2$(PPh$_3$)$_2$Cl$_2$ (379 mg, 0.32 mmol, Aldrich), and (4-cyanophenyl)boronic acid (1.03 g, 7.06 mmol; Aldrich) in DMF (20 mL, Aldrich) at room temperature. The resulting mixture was then stirred at 85° C. for 16 hours. After cooling to room temperature the mixture was diluted with ethyl acetate (50 mL, Aldrich), the aqueous layer was separated, and then the organic layer was washed with brine, dried over MgSO$_4$ (Aldrich) and concentrated. The residue was purified via flash chromatography on silica gel (Aldrich) eluting with hexanes:ethyl acetate (7:3) (Aldrich) to gain a colorless solid CLC-1 (0.718 g, 43% yield).

Example 3.1: Creation of Liquid Crystal Mixtures

For the application of PDLC, a liquid crystal system may utilize specific combinations of physical properties for improved functionality. One useful property is a wide nematic temperature range. The target nematic range of smart window film was −20 C to +80 C. Historically, no single liquid crystal achieved such a nematic range. Therefore, a formulation composed of a number of liquid crystals was used to achieve a wide nematic temperature range. To achieve such a formulation, a variety of liquid crystals with a low melting point were mixed with a number of liquid crystals with high melting points and with good miscibility and solubility. In the present embodiments, the compounds were based on a biphenyl core. Hence a number of cyanobiphenyl types of liquid crystals were formulated in the following manner.

For formulation 1 (F-1), a mixture of 5CB (0.51 g, 51.0 wt %, Qingdao QY Liquid Crystal Co., Ltd., Chengyang, Qingdao, China), 7CB (0.25 g, 25.0 wt %, Qingdao QY Liquid Crystal), 8OCB (0.08 g, 8.0 wt %, Qingdao QY Liquid Crystal), 5CT (0.08 g, 8.0 wt %, Qingdao QY Liquid Crystal) and 2-pentyl-5-((3,3',4'-trifluoro-[1,1'-biphenyl]-4-yl)ethynyl)thiophene (LC-1) (0.08 g, 7.1 wt %) are mixed in a clear sample bottle and then put in a shaker (VWR Advanced Digital Shaker, Model-3500 ADV 120V) overnight to mix the liquid crystal compounds. The sample bottle is then heated on a hot plate at 120° C. to dissolve any remaining components. Then gentle shaking by hand is done for one to two minutes until a clear solution appears. The mixture is then kept on a hot plate for another two minutes. The resulting clear solution is then cooled at room temperature and then is confirmed to have a turbid liquid appearance, which is typical for liquid crystal formulation. A small amount (5-10 mg) of formulation-1 is taken to measure differential scanning coulorimetry (DSC) (TA Instrument, Model-Q2000). A single phase transition peak is ascertained at a determined temperature. Normally if the mixture is homogeneous then it should have a single phase transition temperature different from the individual melting temperature of the components. The presence of this single phase transition temperature, termed as eutectic temperature, would confirm a eutectic mixture.

The process is repeated for additional mixtures with the exception that the mass ratios of the constituents are varied as shown in Table-1. It is anticipated that their eutectic mixtures will be confirmed by single transition phases from Nematic to Isotropic.

TABLE 1

Mixture Formulations and Associated Phase Properties

| Formulation | 5CB (wt %) | 7CB (wt %) | 8OCB (wt %) | 5CT (wt %) | 5CCB (wt %) | MLC-2132 (wt %) | Compound/ (wt %) | Nematic Range [° C.] |
|---|---|---|---|---|---|---|---|---|
| F-1 | 51 | 25 | 8 | 8 | 0 | 0 | LC-1/8 | C'-20 N 61 I |
| F-2 | | | | | | 94.9 | CLC/5 | |
| F-3 | | | | | | 96.8 | LC-1/3.2 | |
| F-4 | | | | | | 95.4 | LC-2/4.6 | |
| F-5 | | | | | | 95.1 | LC-4/4.9 | |
| CF-1 | 51 | 25 | 8 | 8 | 0 | 0 | CLC-1/8 | C-20 N 58 I |
| CF-2 | | | | | | 100 | | C-20 N 115 I |

TABLE 2

Mixture Formulations and Associated Phase Properties.

| Mixture | 5CB (wt %) | 7CB (wt %) | 8OCB (wt %) | 5CT (wt %) | 5CCB (wt %) | 6CHBT (wt %) | Dopant/ (wt %) | LC Comp/ (wt %) | Nematic Range [° C.] |
|---|---|---|---|---|---|---|---|---|---|
| F-6 | 49 | 11.1 | 5.3 | 9.8 | 15 | 9.9 | — | —/0.0 | C-20 N 80.5 I |
| F-7 | 46.2 | 10.4 | 5.0 | 9.2 | 14.1 | 9.3 | — | CLC/5.8 | C-20 N 81.2 I |
| F-8 | 46.8 | 10.5 | 5.1 | 9.4 | 14.3 | 9.5 | — | LC-1/4.4 | C-20 N 84.5 I |
| F-9 | 46.8 | 10.5 | | 9.3 | 14.3 | 9.4 | 4.6 | — | LC-2/4.6 | C-20 N 84.7 I |
| F-10 | 46.7 | 10.5 | 5.1 | 9.3 | 14.3 | 4.6 | — | LC-4/4.6 | C-20 N 82.3 I |

[1] LC compound 8OCB was procured from Qingdao QY Liquid Crystal Co, Ltd., Chengyang, Qingdao, China.

[2] DSC Equipment was not run below −20° C.

[3] This transition was obtained via POM on the cooling cycle.

Example 4.1 Composition Polarization Observations

The synthesized compounds can be examined with an optical microscope in a crossed polarization lighting condition to characterize their liquid crystal behavior and to study the composition's birefringence, or the difference between high and low refractive index of anisotropic liquid crystal molecules.

For the setup, a microscope (BX-53F; Olympus, Tokyo, Japan) is setup for polarizing microscopy with the analyzer attachment (U-PA, Olympus) rotated 90 degrees from the polarizer filter (BX45-PO, Olympus) all within the optical path from an adjustable 100 watt halogen light attachment (U-LH100HG, Olympus). In addition, to capture the images, the microscope is also equipped with a video camera adapter (U-TVO.35XC-2, Olympus) which is further connected to a computer for capturing the images. For measurement, the samples are placed on the microscope's stage placing them in the halogen lamp's optical path between the polarizer and the analyzer. Since the polarization between the analyzer and polarizer are completely mismatched by 90 degrees, if the sample is isotropic, e.g. glass, the light emitted from the source would be nearly completely blocked by the second polarizer because the unblocked polarized light exiting the first polarizer would not bend and would be subsequently blocked by the analyzer. The blockage of the remaining light by the mismatched analyzer is due to the inability of isotropic materials to change the polarization direction of light passing through them. However, if an anisotropic sample is placed in between both polarizer films, the polarized light passing through the sample material can change polarization if the sample exhibits birefringence properties resulting in a light component that will not be blocked by the analyzer, or a detected interference pattern. Since glass is isotropic and minimally affects light polarization, the liquid crystal compositions can be sandwiched between two glass substrates during the measurements with minimal interference upon the measurements.

In addition to the microscope setup, a heating stage (FP 82 HT, Mettler Toledo, Columbus, Ohio, USA) and associated controller (FP 90, Mettler Toledo) can be used to heat the samples sandwiched in glass to specified temperatures before measurements are taken allowing determination of the birefringence properties of the samples at specific temperatures in order to determine their phase as a function of temperature.

If a nematic or smectic phase was present after cooling and the samples exhibited birefringence, it was detected as a transformed light component at the microscope or an interference pattern of light. If the material was in an isotropic phase, it was observed by the detection of no discernible light at the microscope, or darkness due to no transformation of light and subsequent blockage by the second polarizer.

For the measurements, the liquid crystal composition, LC-1, made as described above, was placed into the setup to measure the phase behavior. Starting at 20° C., an image was captured to baseline the mixture phase. Then, during the first heating cycle the liquid crystal molecules in the sample were heated at a rate of 20° C. per minute until a black image was observed, which indicated an isotropic phase change, and the temperature was recorded. Then during cooling, when an interference color image was observed as a result of the samples transition back to nematic and/or smectic from isotropic, the phase transition temperature was re-verified and an image was recorded. Then, during the second heating cycle, the samples were heated at a heating rate of 5° C. per min in order to carefully record the phase change temperature. This procedure was repeated for the other LC compounds. In addition, a comparative sample of only MLC-2132 (EMD Chemicals, Gibbstown, N.J., USA) was also measured.

It was observed that MLC-2132 was nematic at room temperature and had an isotropic phase change, or clearing point, temperature of 115° C. Additional mixtures are measured using a procedure similar to that of LC-1 with the exception that the respective compound will be as depicted in Table 2.

TABLE 2

Observed Transition Temperatures for Various Compositions.

| Compounds | LC Phase Transition Temperatures [° C.] |
|---|---|
| LC-1 | C 29 N 45 I |
| LC-2 | C 62 N 73 I |
| LC-4 | C 100 S 110 I |
| CLC-1 | C 42 I |

Example 5.1: Fabrication of LC-Based Dimmable Device Using Capillary Method

In Example 5.1, a selectively dimmable device based on a heterocyclic-based liquid crystal compound with positive dielectric anisotropy was fabricated using the capillary method. For the capillary method, a homogeneous-type liquid crystal test cell (KSRO-10/B107M1NSS05, E.H.C Co. Ltd, Tokyo, Japan) was used for making the device. The test cell comprises two substrates with supports that defined an active alignment area in between the two substrates. The size of the glass/ITO substrate was 20 mm×25 mm with a sheet resistance of about 100 Ω/sq and the active alignment area was about 10 mm×10 mm with a cell gap of 10 μm. The cell was procured pre-coated with a polyamide alignment layer (LX-1400, Hitachi-Kasei Shoji Co., Ltd., Tokyo, Japan) so that no application of the alignment layers was necessary. Also, since the geometry of the cell included supports to ensure preservation of the cell gap, separate spacers were not required to be inserted into the cell before application of the liquid crystal mixture.

First, the test cell was baked at 150° C. for 30 min before injection of the liquid crystal mixture to remove any impurities and any vapors inside the crystal chamber. A liquid crystal mixture was then prepared by first mixing LC-1 and MLC-2132 (EMD Chemicals, Gibbstown, N.J., USA) with a weight ratio of 5 wt % to 95 wt % respectively using an ultrasonic homogenizer to mix the formulation at about 100° C. Next, the polymer precursors, reactive mesogen, LC-242 (BASF Corporation, Florham Park, N.J., USA) and photo initiator, Irgacure 651 (BASF) in mass ratios of 10 wt % of the liquid crystal mixture and 1 wt % of the liquid crystal mixture respectively can be dissolved in 50 vol % THF (Aldrich) followed by mixing in a vortex mixer to create a precursor mixture. Then, the precursor mixture was slowly added to the liquid crystal mixture still at 100° C. The resulting liquid crystal composition was then mixed with an ultrasonic homogenizer under a vacuum to thoroughly mix the solution and remove excess THF to yield a hot coating formulation.

Next, the test cells were pretreated for the liquid crystal injection by warming the substrates at 80° C. for 5 minutes on a hot plate. Then, the hot coating formulation was injected near the opening of the test cell. The solution was then allowed to enter into the test cell by capillary action until it coated the entire active alignment area. In some embodiments, the test cell was put on a hot plate after injecting coating formulation to help ensure homogenous coverage of the liquid crystal. The resulting coated substrates were then soft baked at 80° C. for 3 minutes on a hot plate to remove any residual solvent. After soft baking, the result was a layered cell assembly, ready for ultraviolet (UV) radiation curing (UV-curing).

The layered cell assembly was then put on a stainless steel plate to provide a thermal sink so that the cell did not overheat during UV-curing. The assembly was then cured under a UV LED (365 nm, Larsen Electronics, Kemp, Tex. USA) at an output of about 50 mW/cm² incident power for about 3 minutes on each side to photo polymerize the LC-242. To keep the temperatures of the assembly from localized blooming as a by-product of the UV irradiation, the orientation of the sample was switched at approximately 3-minute intervals by flipping the assembly over. The result was an unsealed, dimmable assembly.

After UV-curing, the edges were optionally sealed with a sealant to protect the liquid crystal element. After encapsulation, the assembly can then be baked in an oven at 80° C. for 30 minutes, which can result in a sealed, dimmable assembly.

Next, the dimmable assembly was placed in electrical communication with a voltage source by electrically attaching a conducting clamp and wire in electrical communication with a voltage source to each conductive substrate such that when a voltage is applied across the voltage source, an electrical field is applied across the liquid crystal composition.

While not wanting to be limited by theory it is thought that the voltage source will provide the necessary electrical field across the device to rotate the dispersed liquid crystals resulting in a mismatch of the index of refraction the liquid crystal element. The result was selectively dimmable device #1 (DD-1).

Example 5.2: Fabrication of Additional LC-Based Dimmable Devices

In Example 5.2, additional devices can be formulated using the same methodology as in Example 5.1 with the exception that the mass ratios and additives were varied according to Table 3.

TABLE 3

Variances between the Fabricated Dimmable Elements.

| Device | Example | Liquid Crystal Components Mass Fractions | Polymer Additives (Mass Fraction Relative to LC Composition) | Polyimide | Dielectric Anisotropy |
|---|---|---|---|---|---|
| DD-1 | Example 4.1 | LC-1 (3.0 wt %) MLC-2132 (97.0 wt %) | LC-242 (11.1 wt % of LC) Igracure 651 (0.48 wt % of LC) | LX-1400 | Positive |
| DD-2 | Example 4.2 | LC-2 (5.0 wt %) MLC-2132 (95.0 wt %) | LC-242 (9.7 wt % of LC) Igracure 651 (0.87 wt % of LC) | LX-1400 | Positive |
| DD-4 | Example 4.2 | LC-4 (5.0 wt %) MLC-2132 (95.0 wt %) | LC-242 (9.3 wt % of LC) Igracure 651 (0.89 wt % of LC) | LX-1400 | Positive |
| CDD-1 | Example 4.2 | MLC-2132 (100.0 wt %) | LC-242 (9.3 wt % of LC) Igracure 651 (1.0 wt % of LC) | LX-1400 | Positive |
| CDD-2 | Example 4.2 | CLC-1 (5.0 wt %) MLC-2132 (95.0 wt %) | LC-242 (10.0 wt % of LC) Igracure 651 (1.0 wt % of LC) | LX-1400 | Positive |

Example 6.1: Optical Measurements

In Example 6.1, the optical characteristics of the fabricated dimmable devices were characterized by measuring the light allowed to pass through each, both with and without an electric field present. Light transmittance data for the samples were measured using a haze meter (HM-150; Murakami Color Research Laboratory, Tokyo, Japan) with each respective sample placed inside the device. The source was directly measured without any sample present to provide a baseline measurement of total light transmitted. Then, the samples were placed directly in the optical path, such that the emitted light passes through the samples. Then the sample, connected to a voltage source (3PN117C Variable Transformer; Superior Electric, Farmington, Conn., USA) via electrical wires, one wire connected to each terminal and to a respective ITO glass substrate on the device such that an electric field would be applied across the device when a voltage source is energized or a voltage applied, was placed into the haze meter. Then, the emitted light transmitted through the samples was measured, at first with no voltage applied and then again at various magnitudes of voltage, ranging from 0 volts to an upper voltage of 100 volts; with haze measurements taken at the different voltage levels. In addition, the transmittance was recorded for each device at zero voltage to determine the relative transparency of each device.

Figure 5:
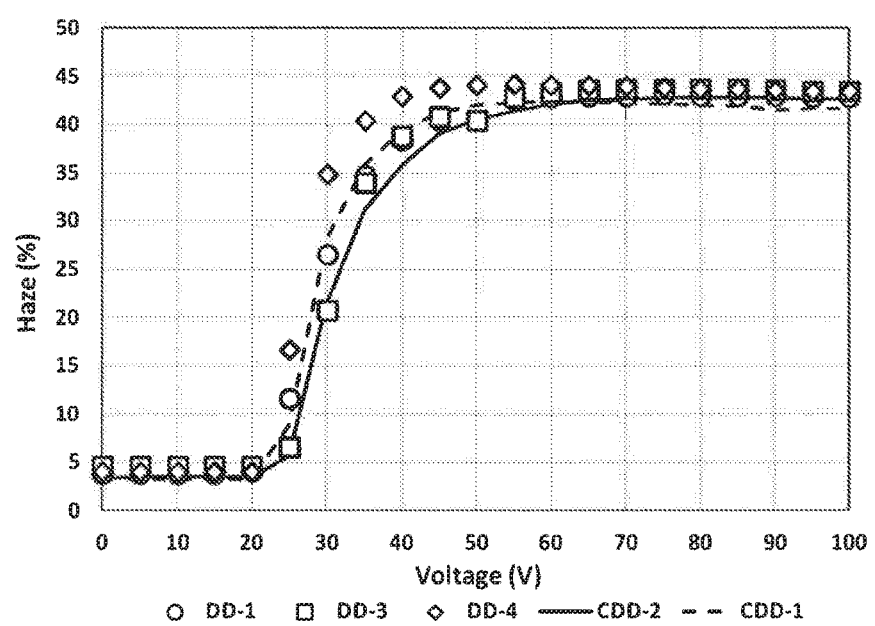
FIG. 5 is a plot showing haze results between the fabricated dimmable device embodiments.

As shown in FIG. 5, it was observed that the devices with the synthesized liquid crystal compositions performed better, i.e., a higher haze at the same or lower driving voltage, than comparative devices with the comparative liquid crystal compound CLC-1. In addition, a surprising result is that while compound LC-4 had a smectic phase when mixed with the nematic MLC-2132, it performed better than the other compounds. In addition, as shown in FIG. 6, all devices had a comparable transmittance at zero volts, ranging from about 85% to 86%.

Additional measurements are planned to characterize the additional planned dimmable devices. It is envisioned that those devices will behave similar to the device measured and disclosed herein.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

The invention claimed is:

1. A liquid crystalline composition comprising a first liquid crystalline compound represented by the formula:

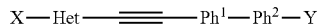

wherein X is $C_{3-8}$ alkyl;

Y is F, Cl, —$OCH_3$, $CH_3$, $CF_3$, or CN;

Het is thienyl, thiazolyl, or 1,3,4-thiadiazolyl, wherein Het is optionally substituted with one or more substituents, wherein the substituents are independently H, F, Cl, $OCH_3$, $CH_3$, $CF_3$, or CN; and $Ph^1$ and $Ph^2$ are p-phenyl, wherein $Ph^1$ and $Ph^2$ are optionally substituted with one or more substituents, wherein the substituents are indpendently H, F, Cl, $OCH_3$, $CH_3$, or CN.

2. The liquid crystalline composition of claim 1, wherein the first liquid crystalline compound is further represented by a formula:

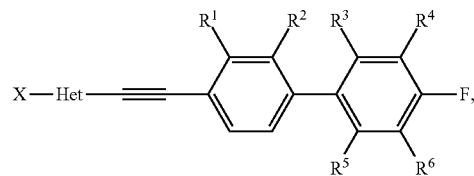

wherein $R^1$-$R^6$ are independently H or F.

3. The liquid crystalline composition of claim 2, wherein $R^1$ is F.

4. The liquid crystalline composition of claim 2, wherein $R^4$ is F.

5. The liquid crystalline composition of claim 2, wherein $R^2$ is H.

6. The liquid crystalline composition of claim 2, wherein $R^3$ is H.

7. The liquid crystalline composition of claim 2, wherein $R^5$ is H.

8. The liquid crystalline composition of claim 2, wherein $R^6$ is H.

9. The liquid crystalline composition of claim 2, wherein Het is unsubstituted thienyl.

10. The liquid crystalline composition of claim 2, wherein Het is unsubstituted thiazolyl.

11. The liquid crystalline composition of claim 2, wherein Het is 1,3,4-thiadiazolyl.

12. The liquid crystalline of claim 1, wherein the composition comprises a compound represented by:

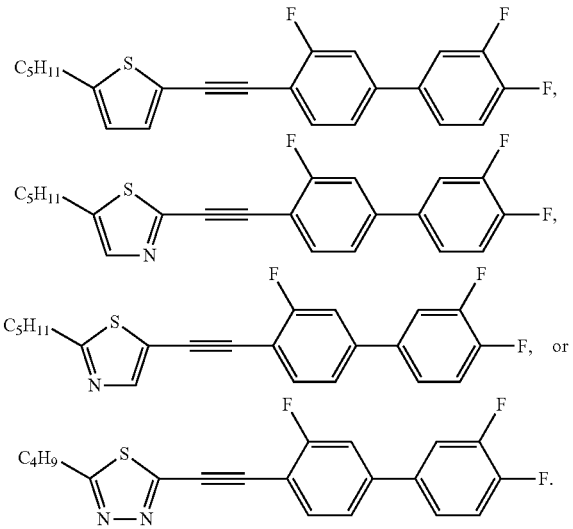

13. The liquid crystalline composition of claim 1, further comprising a second liquid crystalline compound.

14. The liquid crystalline composition of claim 13, wherein the second liquid crystalline compound is of the formula:

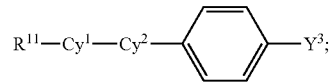

wherein $R^{11}$ is $C_{3-9}$ alkyl or $C_{3-9}$ —O-alkyl, $Cy^1$ is cyclohexyl or phenyl, $Cy^2$ is a single covalent bond or phenyl; and $Y^3$ is CN or —NCS.

* * * * *